United States Patent
Nakatani et al.

(10) Patent No.: US 7,957,703 B2
(45) Date of Patent: Jun. 7, 2011

(54) WIRELESS CIRCUIT DEVICE

(75) Inventors: Toshifumi Nakatani, Osaka (JP);
Hiroyuki Nakamura, Osaka (JP);
Kaoru Ishida, Osaka (JP)

(73) Assignee: Panasonic Corporation, Osaka (JP)

( * ) Notice: Subject to any disclaimer, the term of this patent is extended or adjusted under 35 U.S.C. 154(b) by 783 days.

(21) Appl. No.: 12/063,889

(22) PCT Filed: Oct. 13, 2006

(86) PCT No.: PCT/JP2006/320485
§ 371 (c)(1),
(2), (4) Date: Feb. 15, 2008

(87) PCT Pub. No.: WO2007/046303
PCT Pub. Date: Apr. 26, 2007

(65) Prior Publication Data
US 2009/0104951 A1    Apr. 23, 2009

(30) Foreign Application Priority Data

Oct. 17, 2005  (JP) ................................ 2005-302100

(51) Int. Cl.
*H04B 1/46* (2006.01)
(52) U.S. Cl. ........................ 455/82; 455/63.1; 455/67.13
(58) Field of Classification Search ................. 455/63.1, 455/67.11, 67.13, 78, 79, 82, 83, 126
See application file for complete search history.

(56) References Cited

U.S. PATENT DOCUMENTS

| 5,842,115 | A  |    | 11/1998 | Dent |
| 6,085,071 | A  | *  | 7/2000  | Yamada et al. ................. 455/82 |
| 6,339,711 | B1 |    | 1/2002  | Otaka et al. |
| 6,766,156 | B1 |    | 7/2004  | Hayashihara |
| 7,016,654 | B1 | *  | 3/2006  | Bugeja ............................ 455/73 |
| 7,659,795 | B2 | *  | 2/2010  | Hikita et al. .................... 455/83 |

FOREIGN PATENT DOCUMENTS

| JP | 10-256930    | 9/1998  |
| JP | 11-274968    | 10/1999 |
| JP | 2000-504167  | 4/2000  |
| JP | 2003-283361  | 10/2003 |
| JP | 2004-235966  | 8/2004  |
| JP | 2005-277648  | 10/2005 |

OTHER PUBLICATIONS

International Search Report issued Nov. 28, 2006 in the International (PCT) Application of which the present application is the U.S. National Stage.

* cited by examiner

*Primary Examiner* — Quochien B Vuong
(74) *Attorney, Agent, or Firm* — Wenderoth, Lind & Ponack, L.L.P.

(57) ABSTRACT

A current control circuit (5) recognizes whether or not a transmission signal is transmitted based on a control signal outputted from a transmission signal control circuit (4). When the transmission signal is transmitted, the current control circuit (5) controls a current flowing into a reception circuit (3) in accordance with control information representing any of at least two modes where the transmission signal is transmitted. When no transmission signal is transmitted, the current control circuit (5) controls the current flowing into the reception circuit (3) in accordance with control information representing a mode where no transmission signal is transmitted.

20 Claims, 19 Drawing Sheets

|  | WHEN NO TRANSMISSION SIGNAL IS TRANSMITTED | WHEN TRANSMISSION SIGNAL IS TRANSMITTED | | |
|---|---|---|---|---|
|  | FIRST MODE | SECOND MODE | THIRD MODE | FOURTH MODE |
| LNA CURRENT | 3mA | 4mA | 7mA | 10mA |
| MIX CURRENT | 4mA | 5mA | 10mA | 15mA |
| LO LEVEL | −15dBm | −12dBm | −8dBm | 0dBm |

FIG. 10

| | INTERFERENCE WAVE LEVEL −50dBm OR MORE | | | |
|---|---|---|---|---|
| | WHEN NO TRANSMISSION SIGNAL IS TRANSMITTED | WHEN TRANSMISSION SIGNAL IS TRANSMITTED | | |
| | FIRST MODE | SECOND MODE | THIRD MODE | FOURTH MODE |
| LNA CURRENT | 3mA | 4mA | 7mA | 10mA |
| MIX CURRENT | 4mA | 5mA | 10mA | 15mA |
| LO LEVEL | −15dBm | −12dBm | −8dBm | 0dBm |

| | INTERFERENCE WAVE LEVEL −60 TO −50dBm | | | |
|---|---|---|---|---|
| | WHEN NO TRANSMISSION SIGNAL IS TRANSMITTED | WHEN TRANSMISSION SIGNAL IS TRANSMITTED | | |
| | FIRST MODE | SECOND MODE | THIRD MODE | FOURTH MODE |
| LNA CURRENT | 3mA | 3mA | 4mA | 7mA |
| MIX CURRENT | 4mA | 4mA | 5mA | 10mA |
| LO LEVEL | −15dBm | −15dBm | −12dBm | −8dBm |

| | INTERFERENCE WAVE LEVEL −70 TO −60dBm | | | |
|---|---|---|---|---|
| | WHEN NO TRANSMISSION SIGNAL IS TRANSMITTED | WHEN TRANSMISSION SIGNAL IS TRANSMITTED | | |
| | FIRST MODE | SECOND MODE | THIRD MODE | FOURTH MODE |
| LNA CURRENT | 3mA | 3mA | 3mA | 4mA |
| MIX CURRENT | 4mA | 4mA | 4mA | 5mA |
| LO LEVEL | −15dBm | −15dBm | −15dBm | −12dBm |

| | INTERFERENCE WAVE LEVEL −70dBm OR LESS | | | |
|---|---|---|---|---|
| | WHEN NO TRANSMISSION SIGNAL IS TRANSMITTED | WHEN TRANSMISSION SIGNAL IS TRANSMITTED | | |
| | FIRST MODE | SECOND MODE | THIRD MODE | FOURTH MODE |
| LNA CURRENT | 3mA | 3mA | 3mA | 3mA |
| MIX CURRENT | 4mA | 4mA | 4mA | 4mA |
| LO LEVEL | −15dBm | −15dBm | −15dBm | −15dBm |

FIG. 12B

|  | WHEN NO TRANSMISSION SIGNAL IS TRANSMITTED | WHEN TRANSMISSION SIGNAL IS TRANSMITTED | | |
|---|---|---|---|---|
|  | FIRST MODE | SECOND MODE | THIRD MODE | FOURTH MODE |
| LNA CURRENT | A11 ⋮ A1n | A21 ⋮ A2n | A31 ⋮ A3n | A41 ⋮ A4n |
| MIX CURRENT | M11 ⋮ M1m | M21 ⋮ M2m | M31 ⋮ M3m | M41 ⋮ M4m |
| LO LEVEL | L11 ⋮ L1p | L21 ⋮ L2p | L31 ⋮ L3p | L41 ⋮ L4p |

FIG. 12C

|  | WHEN NO TRANSMISSION SIGNAL IS TRANSMITTED | WHEN TRANSMISSION SIGNAL IS TRANSMITTED | | |
|---|---|---|---|---|
|  | FIRST MODE | SECOND MODE | THIRD MODE | FOURTH MODE |
| ATTENUATION AMOUNT | Ri | Rj | Rk | Re |

WIRELESS CIRCUIT DEVICE

TECHNICAL FIELD

The present invention relates to a wireless circuit device for transmitting and receiving a wireless signal, and more particularly to a wireless circuit device having an antenna duplexer.

BACKGROUND ART

In recent years, perceived as a problem has been a phenomenon where an active circuit of a portable-type wireless terminal device such as a cellular phone is saturated under an influence of an interference wave, thereby resulting in the deterioration of reception sensitivity of a reception signal.

Hereinafter, an exemplary case where the aforementioned phenomenon causes a problem will be described in detail. In a conventional cellular phone, a connection between an antenna and a reception circuit and a connection between the antenna and a transmission circuit are switched between each other, thereby alternately performing reception and transmission. However, a next-generation cellular phone, which will utilize a transmission/reception scheme typified by a W-CDMA (Wideband Code Division Multiple Access) scheme or the like, generally uses an antenna duplexer to perform simultaneous transmission and reception, without performing a circuit connection switching as described above. In the case of using such a transmission/reception scheme typified by the W-CDMA scheme or the like which does not perform such a circuit connection switching, a transmission signal may leak from the transmission circuit into the reception circuit. The transmission signal leaked into the reception circuit becomes an interference wave. Under the influence of such an interference wave, the reception sensitivity is deteriorated, thereby causing the aforementioned phenomenon.

In general, a conventional wireless circuit device suppresses the deterioration of the reception sensitivity caused by the influence of the interference wave by (1) increasing a size of a passive component such as a filter or by (2) causing an active component, such as an amplifier or mixer, capable of increasing current consumption to have a high linearity (i.e., increasing a size of a battery).

In order to address a problem of increased size as described above, there is a radio disclosed in patent document 1 as an example of a wireless circuit device realizing a small-sized portable terminal. FIG. 17 is a block diagram illustrating a functional configuration of the radio disclosed in patent document 1. The radio shown in FIG. 17 detects, in an RSSI1, an output level of a BPF1 having a characteristic which only passes a signal bandwidth and also detects, in an RSSI2, an output level of a BPF2 having a characteristic which passes a bandwidth of an entire system, thereby controlling a current flowing into the reception circuit based on a comparison between the aforementioned two output levels. As such, the deterioration of the reception sensitivity caused by the influence of the interference wave is suppressed.

Alternatively, there is a wireless transmitter/receiver disclosed in patent document 2 as another example of the wireless circuit device realizing the small-sized portable terminal. FIG. 18 is a block diagram illustrating a functional configuration of the wireless transmitter/receiver disclosed in patent document 2. The wireless transmitter/receiver shown in FIG. 18 operates in a second mode where, when a wireless signal is transmitted, the current consumption is large while a low distortion can be realized. On the other hand, the wireless transmitter/receiver operates in a first mode where, when no wireless signal is transmitted, the current consumption is small. As such, the deterioration of the reception sensitivity caused by the influence of the interference wave is suppressed.

Still alternatively, there is a wireless receiving device disclosed in patent document 3 as another example of the wireless circuit device realizing the small-sized portable terminal. FIG. 19 is a diagram illustrating a block diagram of a functional configuration of the wireless receiving device disclosed in patent document 3. The wireless receiving device shown in FIG. 19 operates in a mode where, when a wireless signal is transmitted, a current flowing into a mixer of the reception circuit is controlled so as to increase not only a current consumption of the mixer but also an injection level of local electrical power. On the other hand, the wireless receiving device operates in another mode where, when no wireless signal is transmitted, the current consumption of the mixer is small and the injection level of local electrical power is also small.

[Patent document 1] Japanese Laid-Open Patent Publication No. 10-256930
[Patent document 2] Japanese Laid-Open Patent Publication No. 11-274968
[Patent document 3] Japanese Laid-Open Patent Publication No. 2003-283361

DISCLOSURE OF THE INVENTION

Problems to be Solved by the Invention

In order to reduce the deterioration of sensitivity of the reception circuit, the transmission signal is attenuated by a reception-side filter included in an antenna duplexer. The reception-side filter included in the antenna duplexer passes a signal having a reception frequency bandwidth and attenuates a signal having a transmission frequency bandwidth. However, any transmission signal failed to be attenuated by the reception-side filter may leak into the reception circuit. Such a leaked transmission signal becomes an interference wave, thereby resulting in the deterioration of the reception sensitivity.

The inventors of the present invention examined an attenuation characteristic, within the transmission frequency bandwidth, of the reception-side filter included in the antenna duplexer. FIG. 20 is a diagram illustrating a frequency characteristic of the reception filter included in the antenna duplexer. In FIG. 20, Tx indicates the transmission frequency bandwidth, and Rx indicates the reception frequency bandwidth. As shown in FIG. 20, it becomes clear that a difference between an attenuation amount at the most suppressed frequency and an attenuation amount at the least suppressed frequency is 20 dB or more within the transmission frequency bandwidth Tx.

Therefore, unless measures to suppress the interference wave are taken in consideration of the difference between the attenuation amount at the most suppressed frequency and the attenuation amount at the least suppressed frequency, there may be a case where the interference wave cannot be suppressed in an appropriate manner.

In the radio disclosed in patent document 1, the deterioration of the reception sensitivity cannot be suppressed taking into consideration the leaked transmission signal.

Also, in the wireless receiver disclosed in patent document 2, when the wireless signal is transmitted, the current consumption is only increased uniformly. That is, in the wireless receiver disclosed in patent document 2, when the wireless signal is transmitted, a current flowing into the wireless receiver is only increased uniformly. As shown in FIG. 20, within the transmission frequency bandwidth, there is a difference between maximum and minimum attenuation amounts of the reception-side filter. Thus, the deterioration, of the reception sensitivity, which is caused by the leaked transmission signal cannot be suppressed depending on a frequency of a transmission signal. As a matter of course, if the wireless receiver causes the current consumption to be greater with respect to an end point of the transmission frequency bandwidth at which the suppressed amount of the transmission signal is the smallest, it is possible to suppress the deterioration of the reception sensitivity in the entirety of the transmission frequency bandwidth. With this measure, however, a low current consumption of the reception circuit cannot be realized.

Furthermore, in the wireless receiving device disclosed in patent document 3, when the wireless signal is transmitted, a current flowing into the mixer and an injected local electrical power are only increased uniformly. Thus, the wireless receiving device disclosed in patent document 3 has a similar problem to the wireless receiver disclosed in patent document 2, which is, the low current consumption of the reception circuit cannot be realized.

Therefore, an object of the present invention is to provide a wireless circuit device capable of suppressing an interference wave taking into consideration a frequency characteristic, within a transmission frequency bandwidth, of a reception-side filter included in the antenna duplexer and capable of realizing a low current consumption.

Solution to the Problems

To achieve the above object, the present invention has the following aspects. The present invention is directed to a wireless circuit device for transmitting and receiving a wireless signal, comprising: an antenna for transmitting and receiving the wireless signal; a transmission circuit for outputting a transmission signal; a reception circuit to which a reception signal is inputted; an antenna duplexer for supplying, to the antenna, the transmission signal outputted from the transmission circuit and for inputting the wireless signal received by the antenna to the reception circuit as the reception signal; a transmission signal control circuit for controlling, by means of a control signal, the transmission signal to be outputted from the transmission circuit; a storage section for storing control information used for controlling current flowing into the reception circuit, the control information comprising, control information representing a non-transmission mode where the transmission circuit transmits no transmission signal and at least two further pieces of control information respectively representing at least two transmission modes where the transmission circuit transmits the transmission signal; and a current control circuit for controlling the current flowing into the reception circuit in accordance with the control information, stored in the storage section, comprising the control information representing the non-transmission mode and the at least two further pieces of control information respectively representing the at least two transmission modes, wherein the current control circuit recognizes whether or not the transmission signal is transmitted based on the control signal outputted from the transmission signal control circuit, controls, when the transmission signal is transmitted, the current flowing into the reception circuit in accordance with one of the two further pieces of control information representing any of the at least two transmission modes, and controls, when no transmission signal is transmitted, the current flowing into the reception circuit in accordance with the control information representing the non-transmission mode.

According to the present invention, when the transmission signal is transmitted, there are at least two transmission modes. Therefore, when the transmission signal is transmitted, a low current consumption is realized as compared with when the current flowing into the reception circuit is controlled uniformly.

Preferably, the at least two transmission modes may be different from each other in accordance with a frequency of the transmission signal, and the current control circuit may recognize a frequency of the transmission signal based on the control signal outputted from the transmission signal control circuit, and control the current flowing into the reception circuit in accordance with one of the at least two pieces of control information representing one of the transmission modes with which the recognized frequency is associated.

Thus, it becomes possible to provide a wireless circuit device capable of controlling an interference wave taking into consideration a frequency characteristic of a transmission frequency bandwidth of a reception filter included in the antenna duplexer, and capable of realizing the low current consumption.

Preferably, the control information stored in the storage section may be set such that the closer a frequency bandwidth, represented by one of the transmission modes with which the frequency of the transmission signal is associated, is to each end of a transmission frequency bandwidth, the larger the electrical power injected into the mixer circuit becomes.

The closer a bandwidth is to each end of the transmission frequency bandwidth of the reception filter included in the antenna duplexer, the smaller an attenuation amount is. Thus, within the bandwidth close to each end of the transmission frequency bandwidth, the transmission signal may leak into the reception circuit. However, with a configuration of the present invention, when the transmission signal has a frequency at each end of the transmission frequency bandwidth, the current flowing into the reception circuit in accordance with the frequency becomes larger, thereby making it possible to allow the wireless circuit device to improve the reception sensitivity.

Furthermore, the at least two transmission modes may be different from each other in accordance with an electrical power of the transmission signal, and the current control circuit may recognize an electrical power of the transmission signal based on the control signal outputted from the transmission signal control circuit, and control the current flowing into the reception circuit one of the at least two pieces of control information representing one of the transmission modes with which the recognized electrical power is associated.

Thus, the current flowing into the reception circuit is controlled in accordance with the electrical power of the transmission signal. Therefore, the wireless circuit device causes the current flowing into the reception circuit to be increased as a transmission electrical power increases, thereby making it possible to suppress the interference wave and realize the low current consumption.

Still furthermore, the wireless circuit device may further comprise a reception level detection circuit for detecting a reception level of the reception signal including a desired wave, wherein the at least two transmission modes may be different from each other in accordance with the reception level, and the current control circuit may recognize that the transmission signal is transmitted based on the control signal outputted from the transmission signal control circuit, recognize the reception level detected by the reception level detection circuit, and control the current flowing into the reception circuit in accordance with one of the at least two pieces of control information representing one of the transmission modes with which the recognized reception level is associated.

Thus, the current flowing into the reception circuit is controlled in accordance with the reception level of the desired wave. Therefore, the wireless circuit device causes the current flowing into the reception circuit to be increased as the reception level of the desired wave is smaller, thereby making it possible to suppress the interference wave and realize the low current consumption.

Preferably, the at least two transmission modes may be further different from each other in accordance with a frequency and an electrical power of the transmission signal, and the current control circuit may further recognize a frequency and an electrical power of the transmission signal, and control the current flowing into the reception circuit in accordance with one of the at least two pieces of control information representing one of the transmission modes with which the recognized reception level detected by the reception level detection circuit and with which the recognized frequency and the recognized electrical power of the transmission signal are associated.

Thus, the current flowing into the reception circuit is controlled in accordance with the frequency and the electrical power of the transmission signal. Therefore, the wireless circuit device can cause the current flowing into the reception circuit to be decreased, for example, in the case where the transmission electrical power is small even if the transmission signal has a frequency at each end of the transmission frequency bandwidth, thereby making it possible to allow the wireless circuit device to realize the low current consumption.

Preferably, the wireless circuit device may further comprise an interference reception level detection circuit for detecting an interference reception level of the reception signal including an interference channel in a vicinity of the desired wave, wherein the at least two transmission modes may be further different from each other in accordance with a frequency and an electrical power of the transmission signal, and in accordance with the interference reception level of the reception signal including the interference channel, and the current control circuit may further recognize the interference reception level detected by the interference reception level detection circuit, and control the current flowing into the reception circuit in accordance with one of the at least two pieces of control information representing one of the transmission modes with which the recognized frequency and the recognized electrical power of the transmission signal, the recognized reception level detected by the reception level detection circuit, and the recognized interference reception level detected by the interference reception level detection circuit are associated.

Thus, the current flowing into the reception circuit is controlled in accordance with the frequency and the electrical power of the transmission signal, the reception level, and the interference reception level. Therefore, the wireless circuit device can cause the current flowing into the reception circuit to be increased when necessary, thereby allowing the wireless circuit device to realize a lower current consumption.

The wireless circuit device may further comprise an interference reception level detection circuit for detecting an interference reception level of the reception signal including an interference channel in a vicinity of a desired wave, wherein the at least two transmission modes may be different from each other in accordance with the interference reception level, and the current control circuit may recognize that the transmission signal is transmitted based on the control signal outputted from the transmission signal control circuit, recognize the interference reception level, of the interference channel, detected by the interference reception level detection circuit, and control the current flowing into the reception circuit in accordance with one of the at least two pieces of control information representing one of the transmission modes with which the recognized interference reception level is associated.

Thus, the current flowing into the reception circuit is controlled in accordance with the interference reception level. Therefore, the wireless circuit device can cause the current flowing into the reception circuit to be increased as the interference reception level is higher, thereby realizing the lower current consumption.

Preferably, the interference reception level detection circuit may select a signal including an adjacent channel of the desired wave and a channel next to the adjacent channel, and detect a reception level of the signal as the interference reception level.

Thus, only the reception level of the interference channel, which exerts a great influence on the reception sensitivity, is detected. Therefore, the wireless circuit device does not need to unnecessarily increase the current flowing into the reception circuit, thereby realizing the lower current consumption.

Preferably, the current flowing into the reception circuit when the current control circuit controls the reception circuit in accordance with one of the at least two pieces of control information representing one of the transmission modes may be larger than the current flowing into the reception circuit when the current control circuit controls the reception circuit in accordance with the control information representing the non-transmission mode.

Thus, the wireless circuit device can realize the low current consumption in the case where no transmission signal is transmitted. As a result, an available standby time is prolonged.

The current control circuit may control the current flowing into the reception circuit by controlling an electrical power injected from a local oscillator into a mixer circuit, both of the local oscillator and the mixer circuit are included in the reception circuit.

Thus, the wireless circuit device can control the current flowing into the reception circuit.

Preferably, the electrical power injected into the mixer circuit in accordance with one of the at least two pieces of control information representing one of the transmission modes may be larger than the electrical power injected into the mixer circuit in accordance with the control information representing the non-transmission mode.

Thus, the wireless circuit device can realize the low current consumption in the case where no transmission signal is transmitted. As a result, the available standby time is prolonged.

Preferably, the at least two transmission modes may be different from each other in accordance with a frequency of the transmission signal, and the current control circuit may recognize a frequency of the transmission signal based on the control signal outputted from the transmission signal control circuit, and control the electrical power injected into the mixer circuit in accordance with one of the at least two pieces of control information representing one of the transmission modes with which the frequency is associated, and the control information stored in the storage section may be set such that the closer a frequency bandwidth, represented by one of the transmission modes with which the frequency of the transmission signal is associated, is to each end of a transmission frequency bandwidth, the larger the electrical power injected into the mixer circuit becomes.

Thus, even when the transmission signal having a frequency at each end of the transmission frequency bandwidth leaks into the reception circuit, the reception sensitivity can be maintained at a constant level.

The at least two transmission modes may be different from each other in accordance with a frequency of the transmission signal, and the wireless circuit device may further comprise attenuation amount measurement storage means for measuring an attenuation amount, within a transmission frequency bandwidth, of a reception filter included in the antenna duplexer so as to be stored as attenuation amount information during a training period, and the storage section previously may store, as prestored control information, the at least two pieces of control information respectively representing the at lease two transmission modes in accordance with the attenuation amount, within the transmission frequency bandwidth, of the reception filter, and the current control circuit may recognize a frequency of the transmission signal based on the control signal outputted from the transmission signal control circuit, and control the current flowing into the reception circuit in accordance with one of the at least two pieces of control information representing the recognized frequency and the recognized attenuation amount with which the recognized frequency is associated.

Thus, during the training period, the frequency characteristic of the reception filter is measured and the current flowing into the reception circuit is controlled based on the frequency characteristic. Therefore, even if a characteristic change caused by manufacturing variations and ambient temperature changes of the antenna duplexer occurs, it becomes possible to provide the wireless circuit device capable of decreasing the current flowing into the reception circuit.

For example, the training period may be a start-up time of the wireless circuit device.

Thus, when the wireless circuit device is started up, a characteristic of the reception filter is measured, thereby making it possible to avoid an effect caused by the manufacturing variations.

For example, the training period may arrive at regular time intervals while the wireless circuit device is in operation.

Thus, it becomes possible to avoid an effect caused by temperature changes or chronological changes other than the manufacturing variations.

For example, the training period may arrive before the transmission signal is transmitted in the wireless circuit device.

Thus, it becomes possible to avoid an effect caused by temperature changes or chronological changes other than the manufacturing variations.

For example, the attenuation amount measurement storage means may include: a control section for causing the transmission circuit to output the transmission signal while changing the frequency of the transmission signal during the training period; a termination section for terminating an antenna-side terminal included in the antenna duplexer when the control section causes the transmission circuit to output the transmission signal; a transmission signal leakage detection circuit for detecting a level of the transmission signal leaked into the reception circuit when the control section causes the transmission circuit to output the transmission signal; and a measurement storage section for measuring, by comparing the level of the transmission signal detected by the transmission signal leakage detection circuit with a level of the transmission signal outputted from the transmission circuit, the attenuation amount, within the transmission frequency bandwidth, of the reception filter included in the antenna duplexer, and for storing the measured attenuation amount in accordance with the frequency of the transmission signal.

Thus, it becomes possible to measure the frequency characteristic of the reception filter and extract the control information based on the measurement results.

Preferably, the reception circuit may include a low-noise amplifier, and the low-noise amplifier may have: an amplifier circuit, disposed on a path from an input terminal to an output terminal, for amplifying a signal inputted from the input terminal; a feedback circuit, disposed between an input and an output of the amplifier circuit, for feeding back the output of the amplifier circuit to the input thereof while changing a phase of a signal passing through the feedback circuit; and a phase control circuit, disposed between an adjustment terminal of the amplifier circuit and an GND, for changing a phase of a signal passing through the amplifier circuit.

Thus, it becomes possible to improve the reception sensitivity more.

Preferably, the reception circuit may include a mixer circuit, and the mixer circuit may have: an amplifier circuit, disposed on a path from an input terminal to an output terminal, for amplifying a signal inputted from the inputted terminal; a frequency conversion circuit for converting a frequency of the signal amplified by the amplifier circuit; a feedback circuit, disposed between an input and an output of the amplifier circuit, for feeding back the output of the amplifier circuit to the input thereof while changing a phase of a signal passing through the feedback circuit; and a phase control circuit, disposed between an adjustment terminal of the amplifier circuit and a GND, for changing a phase of a signal passing through the amplifier circuit.

Thus, it becomes possible to improve the reception sensitivity.

Effect of the Invention

According to the present invention, it becomes possible to provide a wireless circuit device capable of suppressing an interference wave taking into consideration a frequency characteristic, within a transmission frequency bandwidth, of a reception filter included in an antenna duplexer and capable of realizing a low current consumption.

BRIEF DESCRIPTION OF THE DRAWINGS

FIG. 10 is a diagram illustrating an example of the control information stored in a storage section 6b.

FIG. 12B is a diagram illustrating an example of the control information previously stored in a storage section 6c (hereinafter, referred to as prestored control information).

FIG. 12C is a diagram illustrating an example of information (attenuation amount information) concerning an attenuation amount measured by a current control circuit 5c stored in the storage section 6c.

Figure 1:
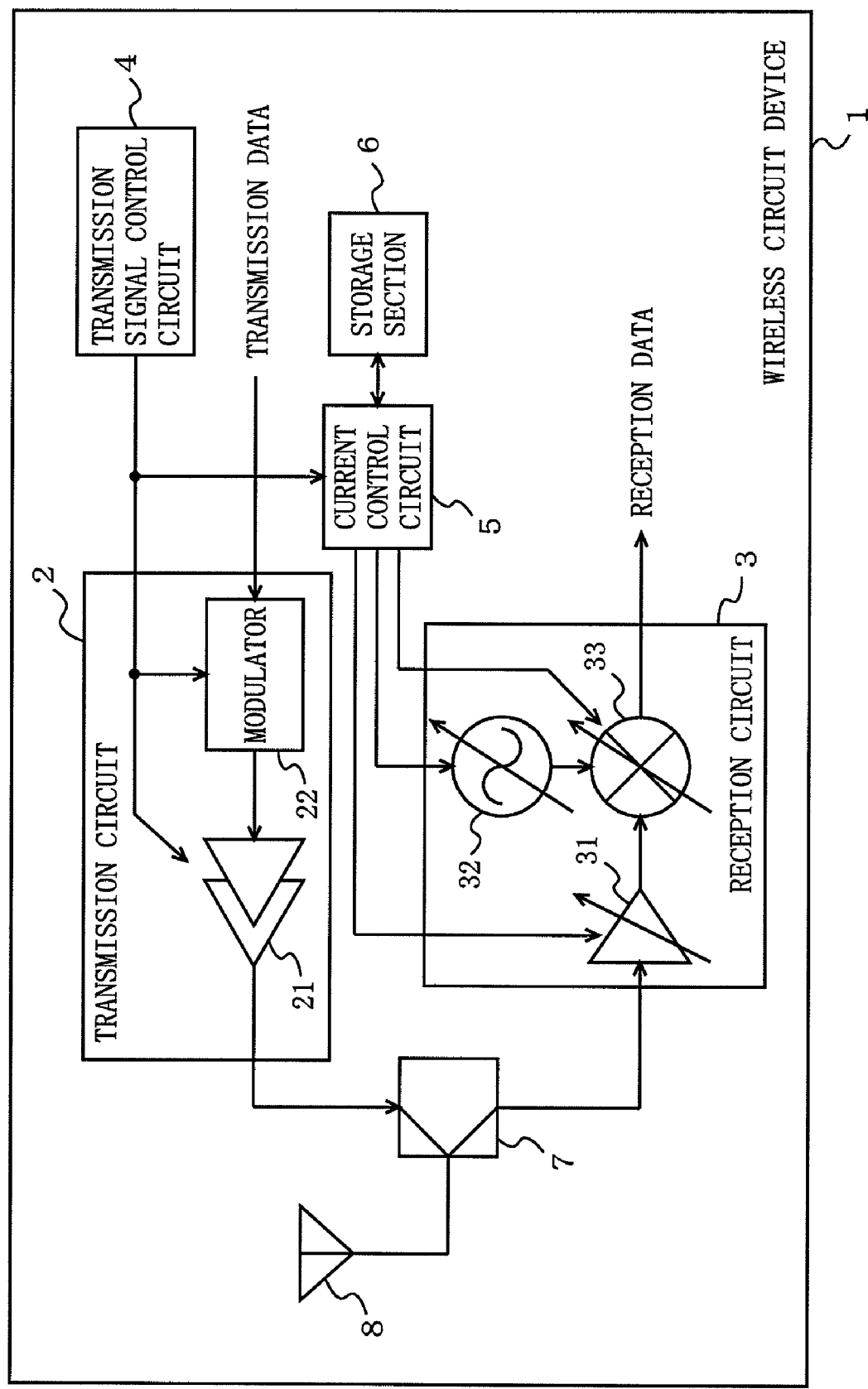
FIG. 1 is a block diagram illustrating a functional configuration of a wireless circuit device 1 of the present invention.

DESCRIPTION OF THE REFERENCE CHARACTERS 1, 1a, 1b, 1c wireless circuit device
2 transmission circuit
3, 3a reception circuit
4 transmission signal control circuit
5, 5a, 5b, 5c current control circuit
6, 6a, 6b, 6c storage section
7 antenna duplexer
8 antenna
9 reception level detection circuit
10 filter
11 near-desired wave reception level detection circuit
12 transmission signal leakage detection circuit
13 switch
14 resistance
15 control section
21 electrical power amplifier
22 modulator
31 low-noise amplifier
32 local signal oscillator
33 mixer
34 baseband circuit 200, 403 phase control circuit
201, 402 feedback circuit
202, 404 amplifier circuit
401 frequency conversion circuit

BEST MODE FOR CARRYING OUT THE INVENTION

First Embodiment

FIG. 1 is a block diagram illustrating a functional configuration of a wireless circuit device 1 according to the present invention. In FIG. 1, the wireless circuit device 1 comprises a transmission circuit 2, a reception circuit 3, a transmission signal control circuit 4, a current control circuit 5, a storage section 6, an antenna duplexer 7, and an antenna 8. The transmission circuit 2 includes an electrical power amplifier 21 and a modulator 22. The reception circuit 3 includes a low-noise amplifier 31, a local signal oscillator 32 and a mixer 33.

The modulator 22 modulates transmission data. A modulation scheme used in the modulator 22 is designated by the transmission signal control circuit 4.

The electrical power amplifier 21 amplifies an electrical power of a signal modulated by the modulator 22 so as to be outputted as a transmission signal. An amplification factor of the electrical power amplifier 21 is designated by the transmission signal control circuit 4.

The transmission signal control circuit 4 designates, by means of a control signal, the modulation scheme used in the modulator 22 and the amplification factor used in the electrical power amplifier 21. Furthermore, the transmission signal control circuit 4 inputs, to the electrical power amplifier 21, the modulator 22 and the current control circuit 5, a control signal indicating whether or not a transmission signal is transmitted and a control signal indicating a frequency of the transmission signal.

The antenna duplexer 7 includes a transmission filter (not shown) and a reception filter (not shown). The transmission filter has a frequency characteristic which passes a signal having a transmission frequency bandwidth therethrough, but which attenuates a signal having a reception frequency bandwidth. The reception filter has a characteristic which passes the signal having the reception frequency bandwidth therethrough, but which attenuates the signal having the transmission frequency bandwidth. Therefore, the antenna duplexer 7 supplies a transmission signal outputted from the transmission circuit 2 to the antenna 8 and also inputs a reception signal received by the antenna to the reception circuit 3.

The antenna 8 outputs the transmission signal as a wireless signal and also inputs a received wireless signal to the antenna duplexer 7 as a reception signal.

The storage section 6 stores control information for controlling a current flowing into the reception circuit 3, the control information comprising, control information representing a mode where the transmission circuit 2 transmits no transmission signal (non-transmission mode) and at least two further pieces of control information respectively representing at least two modes where the transmission circuit 2 transmits a transmission signal (transmission mode).

The current control circuit 5 controls, in accordance with the control information stored in the storage section 6, a current flowing into the low-noise amplifier 31, a level of a local signal outputted from the local signal oscillator 32 and a current flowing into the mixer 33, thereby controlling the current flowing into the reception circuit 3. The current control circuit 5 changes the control information to be used based on whether or not the transmission signal is transmitted and a mode currently used if the transmission signal is transmitted.

Note that the current flowing into the low-noise amplifier 31 and the mixer 33 can be controlled by changing, for example, a base voltage of a bipolar transistor or a gate voltage of a MOSFET, both of the components are included in the low-noise amplifier 31 and the mixer 33. Furthermore, as the current flowing into the reception circuit 3 is decreased, current consumption of the reception circuit 3 accordingly reduces. On the contrary, as the current flowing into the reception circuit 3 is increased, the current consumption of the reception circuit 3 can be accordingly greater. As such, the current flowing into the reception circuit 3 is controlled, thereby making it possible to control the current consumption of the reception circuit 3.

The reception signal outputted from the antenna duplexer 7 is inputted to the low-noise amplifier 31. The low-noise amplifier 31 amplifies the reception signal so as to be inputted to the mixer 33. The low-noise amplifier 31 changes the current flowing thereinto in accordance with a control of the current control circuit 5. The local signal oscillator 32 outputs a local signal having a level in accordance with a control of the current control circuit 5. The local signal outputted from the local signal oscillator 32 is inputted into the mixer 33. Therefore, the current control circuit 5 controls the level of the local signal, thereby controlling an electrical power injected into the mixer 33. The mixer 33 combines the reception signal outputted from the low-noise amplifier 31 and the local signal outputted from the local signal oscillator 32 so as to be outputted as reception data. The mixer 33 changes the current flowing thereinto in accordance with a control of the current control circuit 5.

Figures 2, 3:
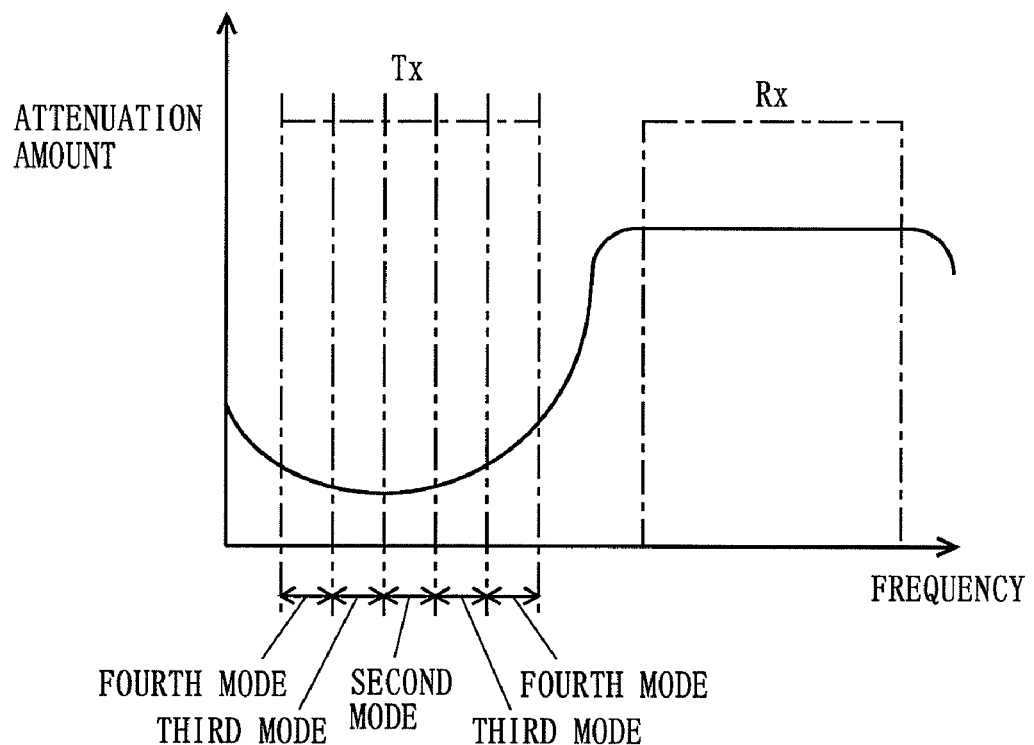
FIG. 2 is a diagram illustrating an example of control information stored in a storage section 6.
FIG. 3 is a diagram illustrating a transmission frequency bandwidth in second to fourth modes.

FIG. 2 is a diagram illustrating an example of the control information stored in the storage section 6. As shown in FIG. 2, four pieces of control information define the current flowing into the low-noise amplifier 31 (herein after, referred to as a LNA current), the current flowing into the mixer 33 (herein after, referred to as a MIX current) and the level of the local signal (herein after, referred to as a LO level) so as to respectively represent first, second, third and fourth modes. In the first mode, no transmission signal is transmitted. In the second to fourth modes, a transmission signal is transmitted and a transmission frequency bandwidth is represented. As described above, it is preferable that a mode where the transmission signal is transmitted may be divided into a plurality of modes in accordance with a frequency of the transmission signal.

FIG. 3 is a diagram illustrating a transmission frequency bandwidth in the second to fourth modes. FIG. 3 exemplary shows a transmission frequency bandwidth Tx and a reception frequency bandwidth Rx of the reception filter included in the antenna duplexer 7. As shown in FIG. 3, in the second mode, a bandwidth in the vicinity of a center frequency of the transmission frequency bandwidth Tx is represented. In the third mode, bandwidths adjacent to the bandwidth represented by the second mode are represented. In the fourth mode, bandwidths externally adjacent to the bandwidths represented by the third mode, are represented. As shown in FIG. 3, within the transmission frequency bandwidth Tx, the closer a bandwidth is to each end thereof, the smaller an attenuation amount is. In other words, the closer to each end of the transmission frequency bandwidth TX a frequency of a transmission signal is, the more likely the transmission signal is to be leaked from the antenna duplexer 7 into the reception circuit 3. Therefore, as shown in FIG. 2, the LNA current, the MIX current and the LO level, all of which are the control information, are set such that the current flowing into the reception circuit 3 increases in a mode with which a frequency bandwidth at each end of the transmission frequency bandwidth TX is associated. Specifically, the current flowing into the reception circuit 3 is the smallest when using the control information representing the first mode where no transmission signal is transmitted, and the current flowing into the reception circuit 3 increases beginning with the second mode, then the third mode to the fourth mode.

The current control circuit 5 recognizes whether or not the transmission signal is transmitted based on the control signal outputted from the transmission signal control circuit 4. In the case where no transmission signal is transmitted, the current control circuit 5 controls the current flowing into the reception circuit 3 based on the control information representing a mode where no transmission signal is transmitted (the first mode in the example of FIG. 2). On the other hand, in the case where a transmission signal is transmitted, the current control circuit 5 recognizes a frequency of the transmission signal based on a signal indicating a frequency of the transmission signal transmitted from the transmission signal control circuit 4, and controls the low-noise amplifier 31, the local signal oscillator 32 and the mixer 33 in accordance with the control information representing a mode with which the recognized frequency is associated, so as to control the current flowing into the reception circuit 3.

In the case where the transmission signal has a frequency which is likely to leak into the reception circuit 3, the current flowing into the reception circuit is increased, thereby making it possible to suppress an interference wave. The reasons therefor will be described below. When the transmission signal leaks into the low-noise amplifier 31, an electrical power larger than a maximum electrical power at which linearity can be maintained with the leaked current is inputted to the low-noise amplifier 31. Therefore, the low-noise amplifier 31 operates in a nonlinear manner. As a result, a noise level increases, whereby a reception signal becomes lost in the noise. However, when the current flowing into the low-noise amplifier 31 is increased, the low-noise amplifier 31 operates in a linear manner. Thus, even when the transmission signal leaks, the noise level does not increase. As a result, the reception signal does not become lost in the noise. From the aforementioned viewpoints, in the control information, the current flowing into the low-noise amplifier 31 is set in each mode with which a frequency of a transmission signal is associated. The same is also true of the mixer 33. Furthermore, other than increasing the MIX current, the linearity of the mixer 33 can be also maintained by increasing the LO level. Thus, in the control information shown in FIG. 2, the LO level changes depending on the modes.

As described above, according to the first embodiment, the current flowing into the reception circuit is controlled in accordance with a frequency of the transmission signal. Therefore, it becomes possible to provide a wireless circuit device capable of controlling an interference wave taking into consideration a frequency characteristic, within a transmission frequency bandwidth, of the reception filter included in the antenna duplexer. Furthermore, unlike the conventional art, in the wireless circuit device according to the first embodiment, the current flowing into the reception circuit is not uniformly increased when the transmission signal is transmitted. Instead, in the wireless circuit device according to the first embodiment, a value of the current flowing into the reception circuit changes in accordance with a transmission frequency. Therefore, in the vicinity of a center of the transmission frequency bandwidth where the current flowing into the reception circuit does not need to be increased, the reception circuit is controlled such that the current flowing thereinto decreases. Thus, in the vicinity of the center of the transmission frequency bandwidth, the wireless circuit device according to the first embodiment can operate the reception circuit by using a minimum required current at which a deterioration of reception sensitivity is within specifications, thereby realizing a low current consumption, i.e., a low electrical power consumption.

Note that the control information defined to represent the frequency of the transmission signal is not limited to the example shown in FIG. 2, if the control information is defined in accordance with the frequency of the transmission signal.

In the above first embodiment, in order to control the current flowing into the reception circuit 3, the current control circuit 5 controls the LNA current, the MIX current and the LO level. However, indexes to be controlled by the current control circuit 5 are not limited thereto, if the current control circuit 5 can control the current flowing into the reception circuit 3. For example, the current control circuit 5 can control the current flowing into the reception circuit 3 by controlling at least one of the LNA current, the MIX current and the LO level. Alternatively, the current control circuit 5 can control the current flowing into the reception circuit 3 by controlling an index.

In the above first embodiment, the mode where a transmission signal is transmitted is divided into a plurality of modes in accordance with a frequency of the transmission signal. However, the aforementioned mode may be divided into a plurality of modes in accordance with an electrical power of the transmission signal. Furthermore, the mode where the transmission signal is transmitted may be divided into a plurality of modes in accordance with the frequency and electrical power of the transmission signal. In each of the plurality of modes, the control information for controlling the current flowing into the reception circuit 3 is defined. The control signal outputted from the transmission signal control circuit 4 includes information concerning an electrical power of the transmission signal (an amplification factor, for example). For example, in W-CDMA, the transmission signal control circuit 4 outputs the control signal including information which causes an electrical power of a transmission signal to be larger as a terminal is farther from a base station, for example. Therefore, the current control circuit 5 can recognize an electrical power of the transmission signal. The current control circuit 5 may recognize the control information representing a mode with which the electrical power and/or frequency of the transmission signal are/is associated, and control the current flowing into the reception circuit 3 in accordance with the control information. Specifically, the larger an electrical power of a transmission signal is, the greater a leakage of the transmission signal is. Thus, the storage section 6 stores the control information which causes the current flowing into the reception circuit 3 to be increased.

Second Embodiment

Figure 4:
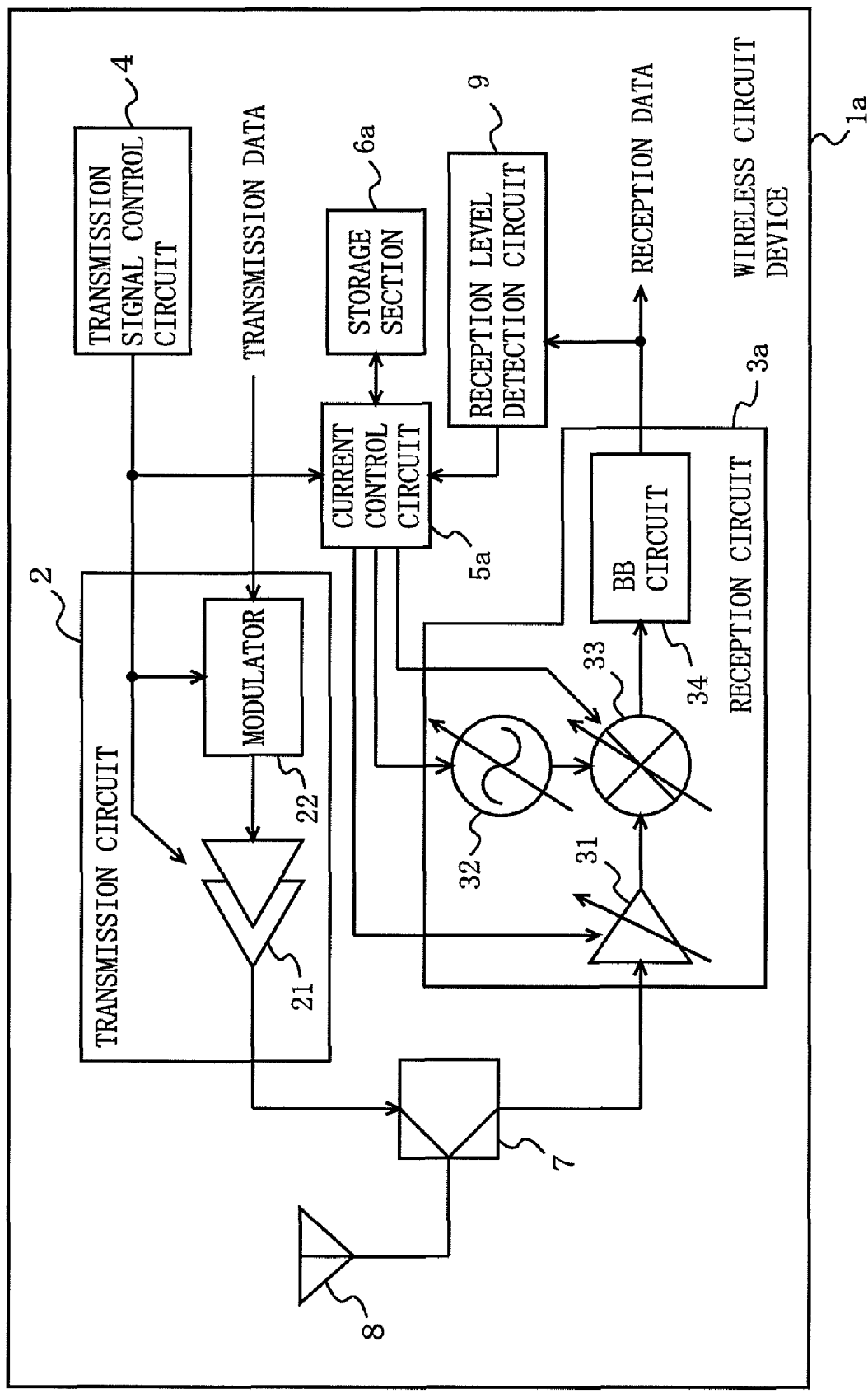
FIG. 4 is a block diagram illustrating a functional configuration of a wireless circuit device 1a according to a second embodiment of the present invention.

FIG. 4 is a block diagram illustrating a functional configuration of a wireless circuit device 1a according to a second embodiment of the present invention. In FIG. 4, the blocks having the same functions as those of the wireless circuit device 1 according to the first embodiment will be denoted by the same reference numerals and will not be further described below. The wireless circuit device 1a is different from the wireless circuit device 1 in that, in the wireless circuit device 1a, the current control circuit 5 is replaced with a current control circuit 5a, the storage section 6 is replaced with a storage section 6a, the reception circuit 3 is replaced with a reception circuit 3a including a baseband circuit (a BB circuit) 34, and a reception level detection circuit 9 is additionally provided.

In a mode where a transmission signal is transmitted, the storage section 6a stores the control information so as to represent a frequency of the transmission signal, an electrical power of the transmission signal and a reception level of a signal having a frequency to be received. In other words, a mode where a transmission signal is transmitted is divided into a plurality of modes in accordance with not only a frequency and electrical power of the transmission signal but also a reception level of a signal having a frequency to be received.

The baseband circuit 34 decreases a bandwidth of a signal outputted from the mixer 33 to a baseband bandwidth so as to perform gain control and channel selection, thereby outputting reception data.

The reception level detection circuit 9 detects a reception level of a desired wave based on the reception data outputted from the baseband circuit 34.

Based on the control signal outputted from the transmission signal control circuit 4 and the reception level of the desired wave detected by the reception level detection circuit 9, the current control circuit 5a recognizes a current mode (the frequency and electrical power of the transmission signal and the reception level of the desired wave), and reads the control information representing the current mode from the storage section 6a, thereby controlling the current flowing into the reception circuit 3a in accordance with the control information. Similar to the first embodiment, in order to control the current flowing into the reception circuit 3a, the current control circuit 5a may control the LNA current, the MIX current and the LO level, for example. However, the present invention is not limited thereto.

Now, a mechanism of reception sensitivity deterioration caused by a leakage of the transmission signal will be described. Mainly, there are two factors of the reception sensitivity deterioration. One factor is a deterioration of an NF (Noise Figure), and the other factor is an interference caused by cross-modulation. The second embodiment exemplifies a configuration capable of suppressing the deterioration of the NF. The deterioration of the NF is caused by a state where, when a leakage of a transmission signal having a large electrical power is inputted to the low-noise amplifier 31 and the mixer 33 included in the reception circuit 3, the low-noise amplifier 31 and the mixer 33 become saturated, then a gain is deteriorated, and finally noise in the vicinity of a baseband bandwidth and a second-order harmonic (white noise, 1/f noise) is converted so as to have a reception frequency bandwidth. The deterioration of the NF can be considered as an increased level of noise generated in the reception circuit 3. Therefore, when a ratio of strength of a received desired wave signal to noise, that is, a S/N becomes equal to or smaller than a threshold value, the reception sensitivity is deteriorated to an extent which does not satisfy specifications.

In the second embodiment, the wireless circuit device 1a recognizes a mode, taking into consideration not only a frequency of a transmission signal but also a reception level of a desired wave included in a reception signal and an electrical power of the transmission signal. In each of the modes, the control information for controlling the current flowing into the reception circuit 3a is set in the storage section 6a so as to prevent the reception sensitivity deterioration in accordance with the frequency of the transmission signal, the reception level of the desired wave and the electrical power of the transmission signal. Therefore, it becomes possible to provide the wireless circuit device 1a capable of suppressing an interference wave, taking into consideration not only the frequency characteristic, within the transmission frequency bandwidth, of the reception filter included in the antenna duplexer but also the electrical power of the transmission signal and the reception level of the desired wave. Furthermore, unlike the conventional art, in the wireless circuit device 1a according to the second embodiment, the current flowing into the reception circuit 3a is not uniformly increased when a transmission signal is transmitted. Instead, in the wireless circuit device 1a according to the second embodiment, the value of the current flowing into the reception circuit 3a is changed in accordance with the transmission frequency, the electrical power of the transmission signal and the reception level of the desired wave. Therefore, in a state where the current flowing into the reception circuit 3a does not need to be increased (for example, when a reception level of the desired wave is high, when an electrical power of the transmission signal is small, when a frequency of the transmission signal is at the center of the transmission frequency bandwidth and the like), the reception circuit 3a is controlled such that the current flowing into the reception circuit 3a decreases. Thus, in the wireless circuit device 1a according to the second embodiment, the reception circuit 3a can be operated by using a minimum required current corresponding to the extent to which a deterioration of reception sensitivity is within specifications, thereby realizing a low current consumption, i.e., a low electrical power consumption.

In the above second embodiment, the mode where the transmission signal is transmitted is divided into a plurality of modes in accordance with the frequency of the transmission signal, the electrical power of the transmission signal and the reception level of the desired wave, and the control information is associated with each of the modes. However, the mode where the transmission signal is transmitted may be divided into a plurality of modes in accordance with only the reception level of the desired wave. In this case, the storage section 6a stores the control information in accordance with the reception level of the desired wave. In such a variant, the control information may preferably be set such that the current flowing into the reception circuit 3a decreases in response to a phenomenon where the higher the reception level of the desired wave is, the less likely the deterioration of the reception sensitivity is to occur, for example. As a detailed operation, the current control circuit 5a may recognize, based on the control signal outputted from the transmission signal control circuit 4, that a transmission signal is transmitted, and further recognize a reception level of the desired wave detected by the reception level detection circuit 9, thereby controlling the current flowing into the reception circuit 3a in accordance with the control information, stored in the storage section 6a, representing the reception level.

Figure 5:
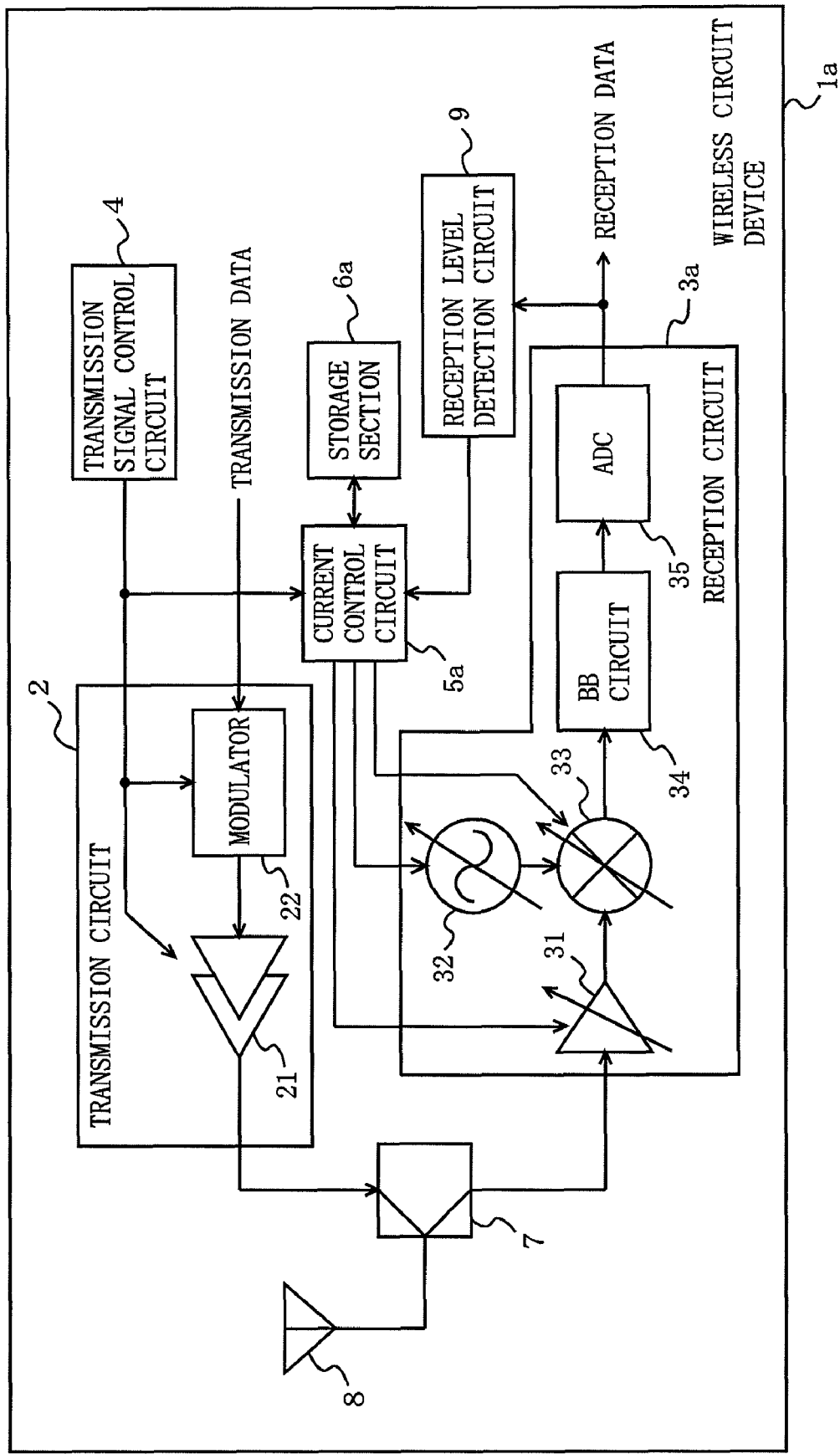
FIG. 5 is a diagram illustrating a functional configuration of the wireless circuit device 1a in which a reception circuit 3a further includes an AD converter 35.

In the above second embodiment, as shown in FIG. 5, the reception circuit 3a may further include an AD converter (ADC) 35. FIG. 5 is a diagram illustrating a functional configuration of the wireless circuit device 1a in which the reception circuit 3a further includes the AD converter 35. In FIG. 5, the AD converter 35, to which an analog signal outputted from the baseband circuit 34 is inputted, performs an AD conversion so as to convert the analog signal into a digital signal. Based on reception data which is the digital signal outputted from the AD converter 35, the reception level detection circuit 9 detects a reception level of the desired wave. Thus, the reception level detection circuit 9 can be digitalized, thereby making it possible to improve an accuracy of detecting the reception level. Furthermore, the current control circuit 5a also can be digitalized, thereby making it possible to control the current with high accuracy.

Third Embodiment

Figure 6:
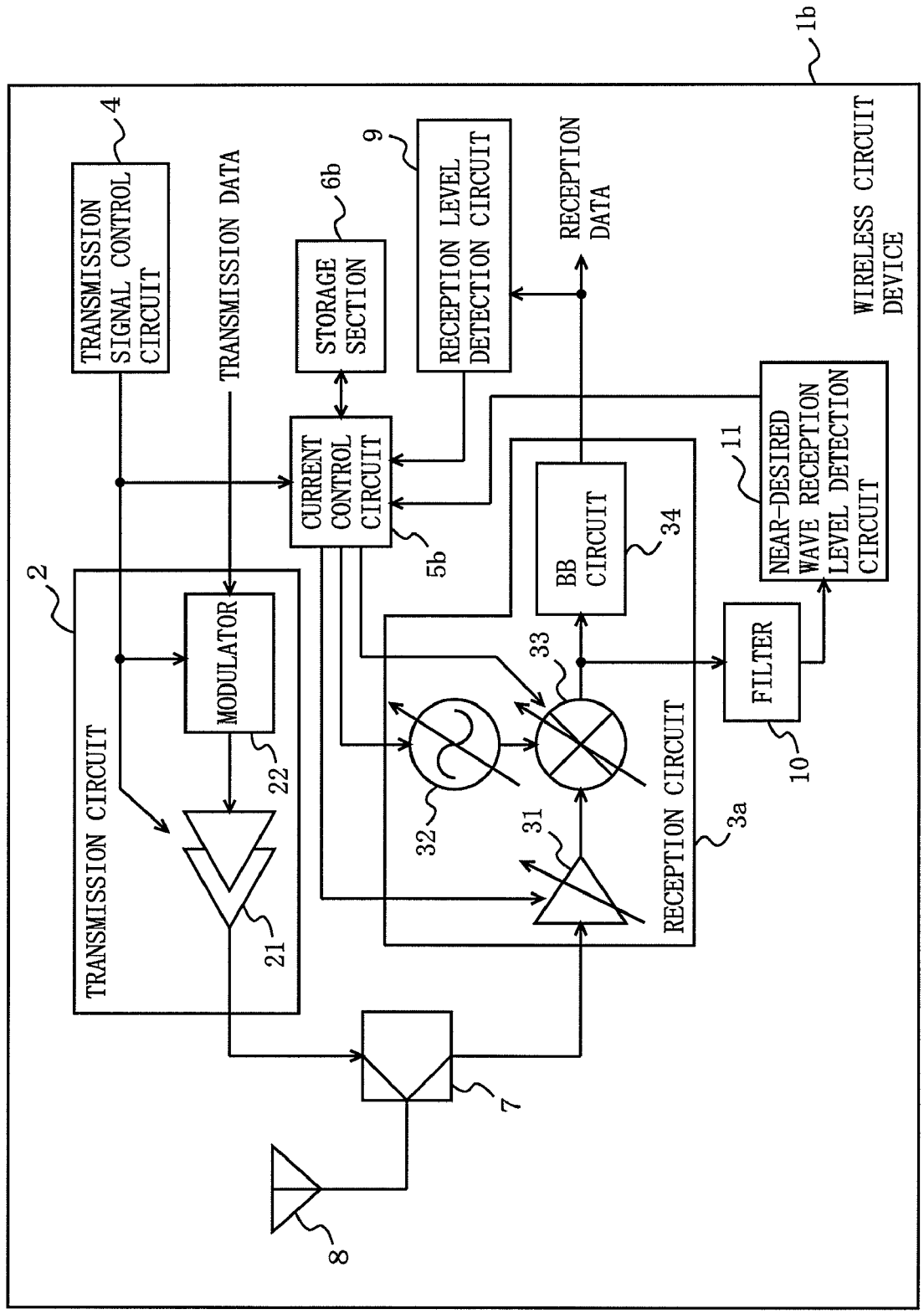
FIG. 6 is a block diagram illustrating a functional configuration of a wireless circuit device 1b according to a third embodiment of the present invention.

FIG. 6 is a block diagram illustrating a functional configuration of a wireless circuit device 1b according to a third embodiment of the present invention. In FIG. 6, the blocks having the same functions as those of the wireless circuit device 1 or 1a according to the first or second embodiment will be denoted by the same reference numerals and will not be further described below. The wireless circuit device 1b is different from the wireless circuit device 1 in that, in the wireless circuit device 1b, the current control circuit 5 is replaced with a current control circuit 5b, the storage section 6 is replaced with a storage section 6b, the reception circuit 3 is replaced with the reception circuit 3a including the baseband circuit (the BB circuit) 34, the reception level detection circuit 9 is additionally provided, and a filter 10 and a near-desired wave reception level detection circuit 11 are additionally provided.

In the mode where a transmission signal is transmitted, the storage section 6b stores the control information so as to represent a frequency of the transmission signal, an electrical power of the transmission signal and a reception level of a signal having a frequency to be received, and an interference reception level of a signal including an interference channel (an adjacent channel and a channel next to the adjacent channel of the desired wave, for example). In other words, the mode where a transmission signal is transmitted is divided into a plurality of modes in accordance with not only a frequency of the transmission signal, an electrical power of the transmission signal and a reception level of a signal having a frequency to be received, but also an interference reception level of a signal including an interference channel (an adjacent channel and a channel next to the adjacent channel of the desired wave, for example).

The reception level detection circuit 9 detects a reception level of the desired wave based on the reception data outputted from the baseband circuit 34.

Figure 7:
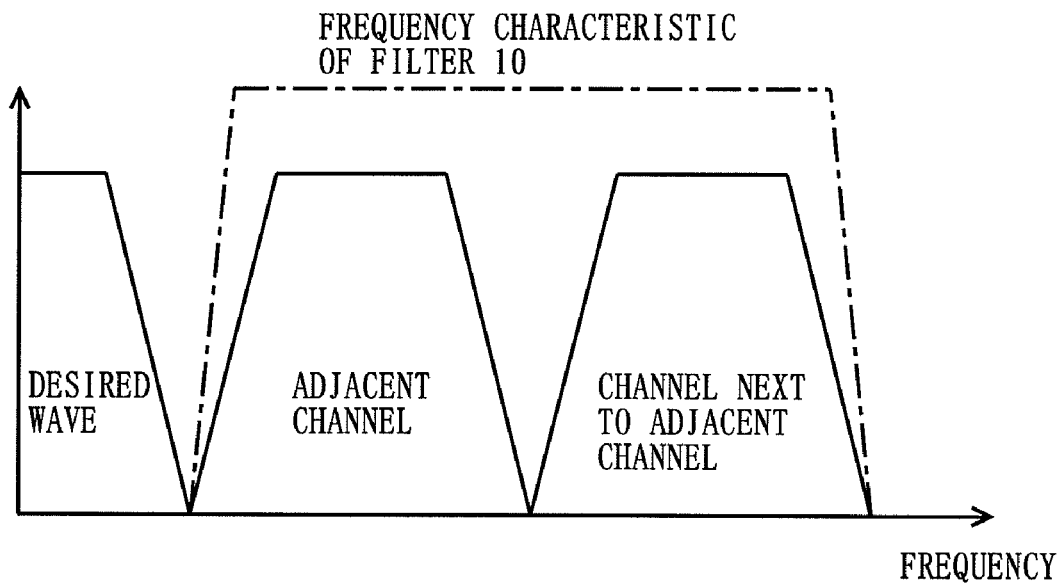
FIG. 7 is a diagram illustrating an example of a frequency characteristic of a filter 10.

The filter 10 passes, if a signal outputted from the mixer 33 includes the interference channel in the vicinity of the desired wave, the signal therethrough. Hereinafter, the present embodiment assumes that an interference channel indicates an adjacent channel and a channel next to the adjacent channel of the desired wave. However, the present invention is not limited thereto. FIG. 7 is a diagram illustrating an example of a frequency characteristic of the filter 10. As shown in FIG. 7, the filter 10 has a frequency characteristic which passes at least the adjacent channel and the channel next to the adjacent channel.

The near-desired wave reception level detection circuit 11 detects an interference reception level of a signal including the interference channel. Therefore, the near-desired wave reception level detection circuit 11 detects a reception level of the adjacent channel and the channel next to the adjacent channel of the desired wave. The filter 10 and the near-desired wave reception level detection circuit 11 selects a signal including the adjacent channel and the channel next to the adjacent channel, and detects a reception level of the signal as the interference reception level. Thus, the aforementioned two components function as an interference reception level detection circuit.

Based on the control signal outputted from the transmission signal control circuit 4 and the reception level of the desired wave detected by the reception level detection circuit 9, and the interference reception level detected by the near-desired reception level detection circuit 11, the current control circuit 5b recognizes a current mode (the frequency and electrical power of the transmission signal, the reception level of the desired wave, and the interference reception level), and reads the control information representing the current mode from the storage section 6b, thereby controlling the current flowing into the reception circuit 3a in accordance with the control information. Similar to the first embodiment, in order to control the current flowing into the reception circuit 3a, the current control circuit 5b may control the LNA current, the MIX current and the LO level, for example. However, the present invention is not limited thereto.

As already described in the second embodiment, there are two factors of the reception sensitivity deterioration caused by a leakage of the transmission signal. The third embodiment exemplifies a configuration capable of suppressing an interference caused by the cross-modulation.

Figure 8:
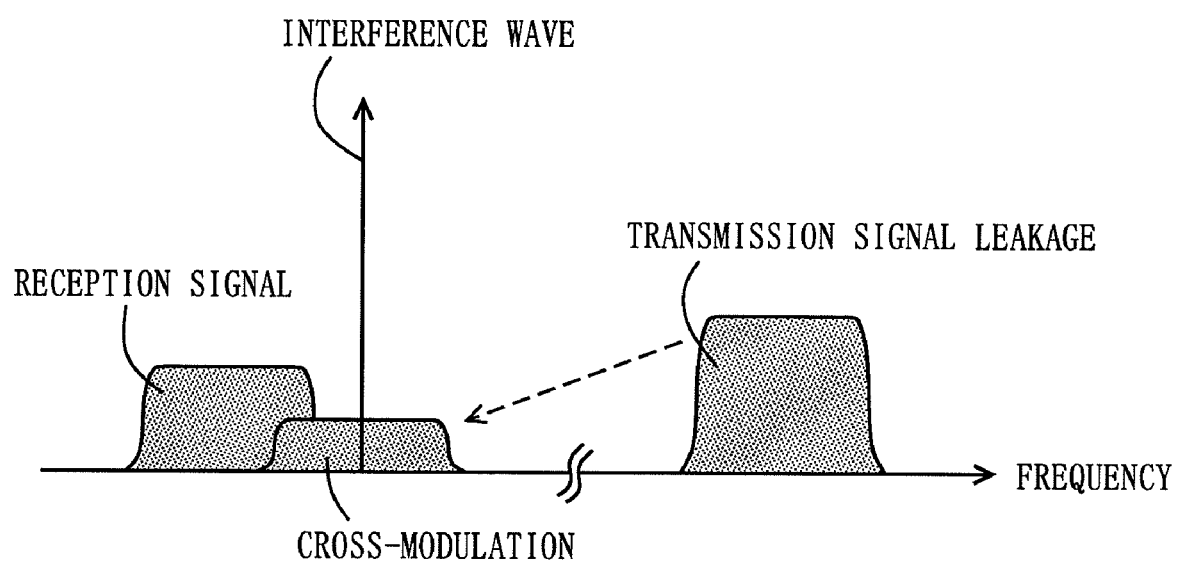
FIG. 8 is a diagram describing a mechanism of an interference caused by cross-modulation.

FIG. 8 is a diagram illustrating a mechanism of the interference caused by the cross-modulation. In an example shown in FIG. 8, it is assumed that a transmission signal having a high level leaks into the reception circuit 3a. Furthermore, it is also assumed that an interference wave having a level higher than or equal to a predetermined level is received by the antenna within a frequency of the adjacent channel and the channel next to the adjacent channel of the desired wave. In this case, due to a third-order nonlinearity of the reception circuit 3a, a signal whose amplitude is equivalent to the square of amplitude of a transmission signal is superimposed on an interference wave in the vicinity of the interference wave. A signal generated due to the third-order nonlinearity of the reception circuit 3a is referred to as cross-modulation. Therefore, in the case where a level of a leaked transmission signal is high, an interference caused by the cross-modulation becomes large if the cross-modulation exists within the adjacent channel and the channel next to the adjacent channel. Hereinafter, the aforementioned mechanism will be described by using the following formulas.

It is assumed that the interference wave received by the antenna is represented by (a) of formula 1, and the leaked transmission signal is represented by (b) of formula 1. Therefore, an amplitude of the leaked transmission signal is represented by $A_2$.

[Formula 1]

$$x(t) = \underbrace{\frac{A_1 \cos \omega_1 t}{(a)}}_{} + \underbrace{\frac{A_2(t) \cos \omega_2 t}{(b)}}_{} \quad \text{(formula 1)}$$

The cross-modulation generated due to the third-order nonlinearity of the reception circuit 3a is represented by y(t) of formula 2. By substituting x(t) for y(t), an influence exerted on the cross-modulation by a level of the leaked transmission signal is apparent. As shown in (c) of formula 2, a value equivalent to the square of the amplitude $A_2$ of the leaked transmission signal is included in the cross-modulation. Thus, as described above, in the case where the level of the leaked transmission signal is high, an interference caused by the cross-modulation becomes accordingly large.

[Formula 2]

$$y(t) = \alpha_1 x(t) \alpha_2 x^2(t) + \alpha_3 x^3(t) \ldots \quad \text{(formula 2)}$$
$$= \left( \alpha_1 A_1 + 3/4 \alpha_3 A_1^3 + \underbrace{\frac{3/2 \alpha_3 A_1 A_2(t)^2}{(c)}}_{} \right) \cos \omega_1 t + \ldots$$

According to the third embodiment, the wireless circuit device 1b recognizes a mode, taking into consideration a frequency and electrical power of a transmission signal, a reception level of a desired wave included in a reception signal, and an interference wave reception level. In each of the modes, the control information for controlling the current flowing into the reception circuit 3a is set in the storage section 6a so as to prevent the deterioration of the reception sensitivity in accordance with the frequency and electrical power of the transmission signal, the reception level of the desired wave included in the reception signal and the interference wave reception level. Based on the electrical power of the transmission signal and the interference wave reception level, a level of the cross-modulation can be assumed (see formula 2). Therefore, it is possible to include, in the control information, information for causing the current flowing into the reception circuit 3a to be maintained at an appropriate value in accordance with the frequency and electrical power of the transmission signal, the reception level of the desired wave included in the reception signal, and the interference wave reception level. Specifically, the current flowing into the reception circuit and the LO level, both of which satisfy the specifications, are determined in accordance with a comparison between a level of the desired wave and a level of the cross-modulation, and therefore the information on the comparison is included in the control information. Thus, the wireless circuit device 1b controls the current flowing into the reception circuit 3a based on the control information, thereby making it possible to suppress an interference wave. Furthermore, the wireless circuit device 1b can operate the reception circuit 3a by using a minimum required current corresponding to the extent to which the deterioration of the reception sensitivity is within specifications, thereby realizing a low current consumption, i.e., a low electrical power consumption.

Figure 9:
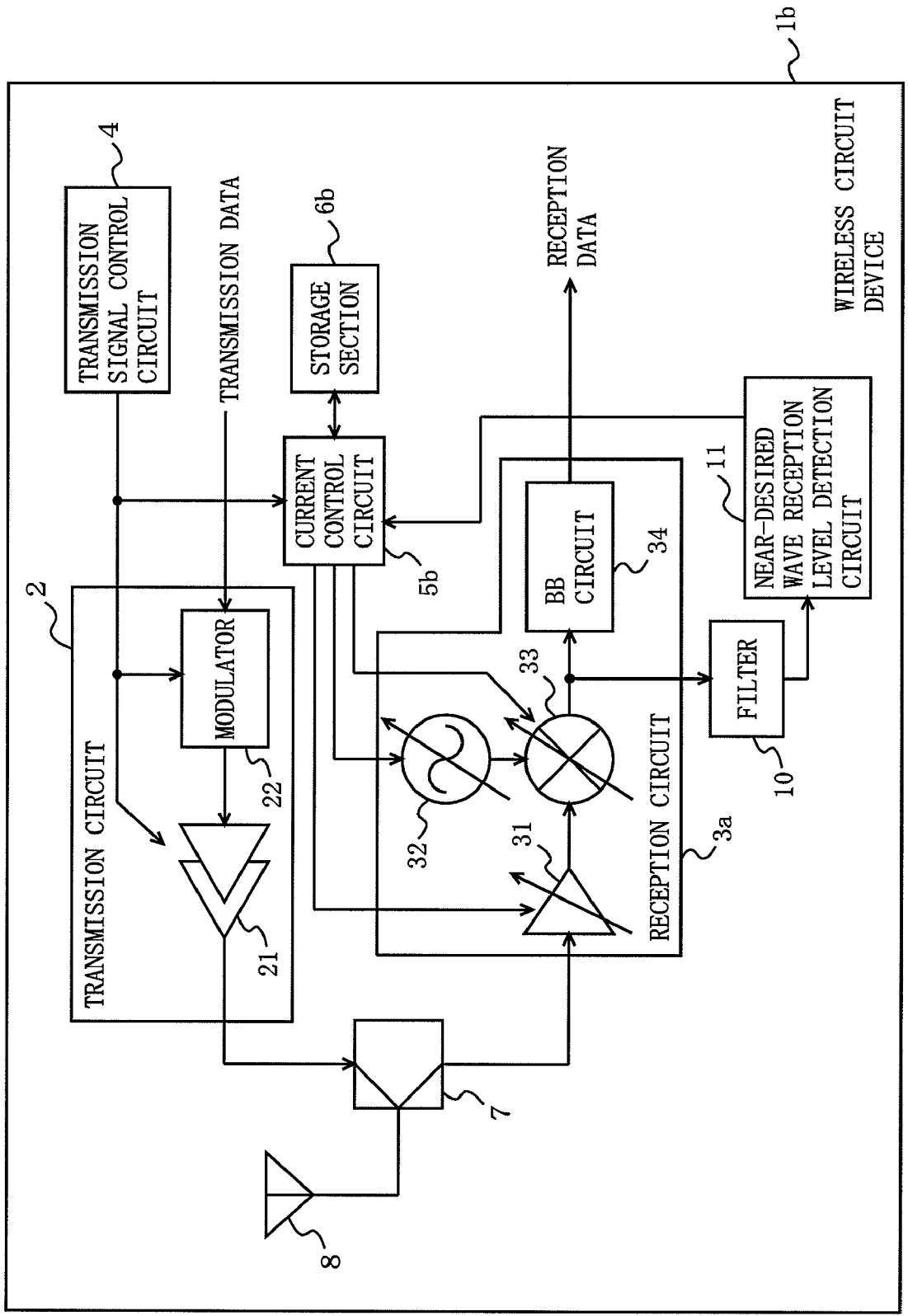
FIG. 9 is a diagram illustrating a functional configuration of the wireless circuit device 1b in which a reception level detection circuit 9 is omitted.

In the third embodiment, it is assumed that the mode where a transmission signal is transmitted is divided into a plurality of modes in accordance with a frequency of the transmission signal, an electrical power of the transmission signal, a reception level of the desired wave and an interference reception level, and the control information is associated with each of the plurality of modes. However, the mode where the transmission signal is transmitted may be divided into a plurality of modes in accordance with only the interference reception level. In this case, the storage section 6b stores the control information in accordance with the interference reception level. Also, in this case, as shown in FIG. 9, the reception level detection circuit 9 may be omitted from the wireless circuit device 1b. FIG. 9 is a diagram illustrating a functional configuration in which the reception level detection circuit 9 is omitted from the wireless circuit device 1b. In such a variant, the control information may preferably be set such that the current flowing into the reception circuit 3a increases in response to a phenomenon where the higher the interference reception level is, the more likely the deterioration of the reception sensitivity is to occur, for example. As a detailed operation, the current control circuit 5b may recognize that a transmission signal is transmitted based on the control signal outputted from the transmission signal control circuit 4, and further recognize an interference wave reception level detected by the near-desired wave reception level detection circuit 11, thereby controlling the current flowing into the reception circuit 3a in accordance with the control information, stored in the storage section 6b, representing the interference wave reception level.

Furthermore, in the case of the configuration shown in FIG. 9, the mode where a transmission signal is transmitted may be divided into a plurality of modes in accordance with the frequency of the transmission signal and the interference reception level. In this case, the storage section 6b stores the control information as shown in FIG. 10, for example. FIG. 10 is a diagram illustrating an example of the control information stored in the storage section 6b. The control information shown in FIG. 10 defines the LNA current, the MIX current and the LO level so as to represent each of the first to fourth modes. Also in FIG. 10, different control information is defined for each of the interference wave levels of −50 dBm or more, −60 to −50 dBm, −70 to −60 dBm, and −70 dBm or less. As such, the mode where a transmission signal is transmitted may be divided into a plurality of modes in accordance with a frequency of the transmission signal and a total electrical power of an interference wave within the adjacent channel and the channel next to the adjacent channel.

Figure 11:
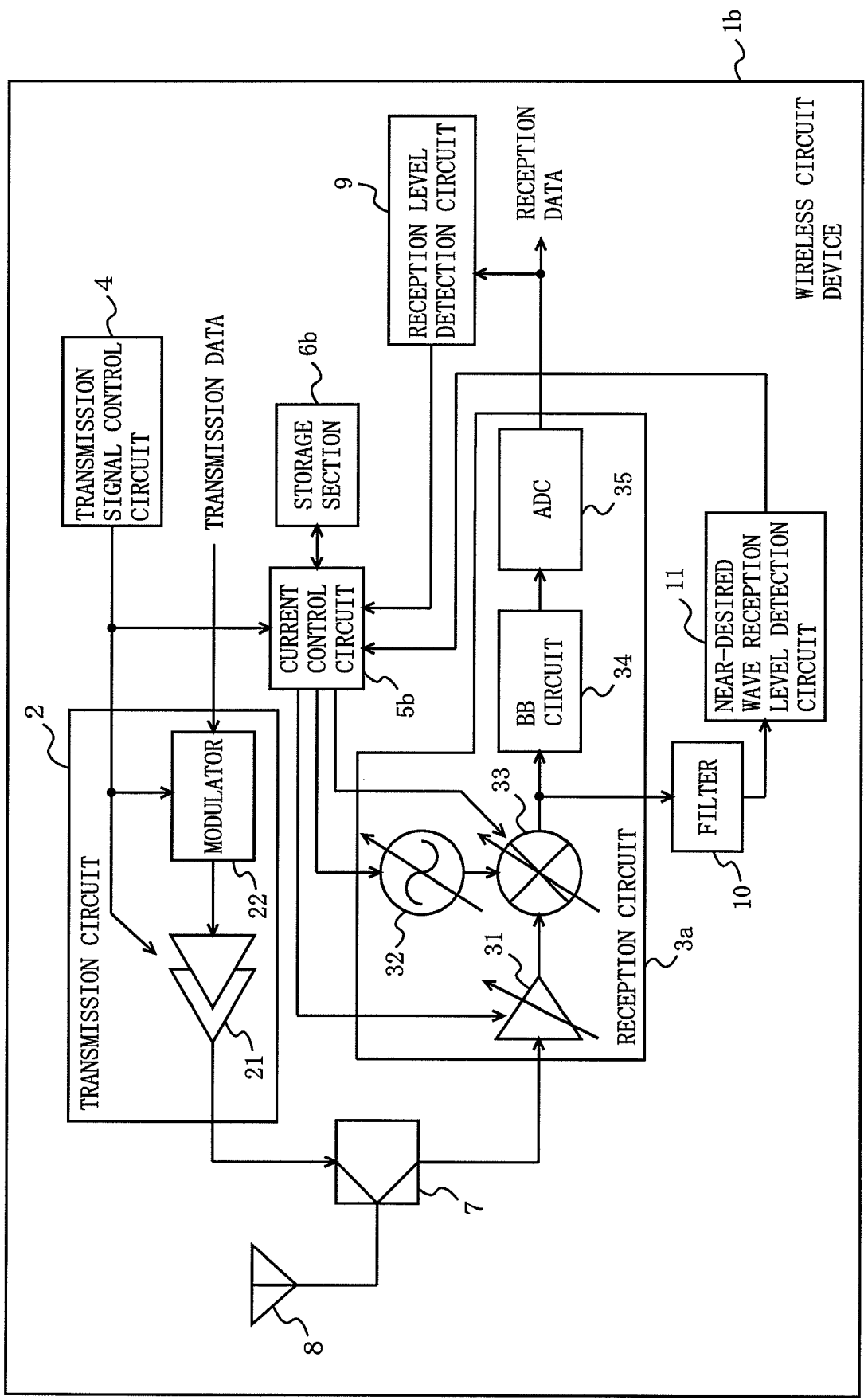
FIG. 11 is a diagram illustrating a functional configuration of the wireless circuit device 1b in which the reception circuit 3a further includes the AD converter 35.

Note that in the third embodiment above, the reception circuit 3a may further include the AD converter (ADC) 35, as shown in FIG. 11. FIG. 11 is a diagram illustrating a functional configuration in which the reception circuit 3a further includes the AD converter 35. In FIG. 11, the AD converter 35, to which an analog signal outputted from the baseband circuit 34 is inputted, performs an AD conversion so as to convert the analog signal into a digital signal. The reception level detection circuit 9 detects a reception level of the desired wave based on the reception data which is the digital signal outputted from the AD converter 35. Thus, the reception level detection circuit 9 can be digitalized, thereby making it possible to improve an accuracy of detecting the reception level. Furthermore, the current control circuit 5b also can be digitalized, thereby making it possible to control the current with high accuracy. Alternatively, in this case, a discrete-time filter formed of a switched capacitor or the like may be used as the filter 10. When using the discrete-time filter whose accuracy is determined by a clock frequency of the switched capacitor or the like, a filter characteristic can be obtained with high accuracy.

Note that in the first to third embodiments, the mode where a transmission signal is transmitted may be divided into at least two modes in accordance with an index other than a frequency of the transmission signal, an electrical power of the transmission signal, a reception level of the desired wave, and an interference wave reception level. Furthermore, the aforementioned four indexes may be freely selected to form any combination, and combination patterns are not limited to the examples described in the above embodiments.

In the first to third embodiments above, the following concepts are implied.

Basically, the current flowing into the reception circuit when the reception circuit is controlled by the current control circuit in accordance with the control information representing the mode where a transmission signal is transmitted is preferably larger than the current flowing into the reception circuit when the reception circuit is controlled by the current control circuit in accordance with the control information representing the mode where no transmission signal is transmitted. This is because in the mode where no transmission signal is transmitted, there is no interference caused by the transmission signal which leaks into the reception circuit, thereby making it possible to maintain the current flowing into the reception circuit at a low level. Thus, a low current consumption can be realized in a reception standby state.

The current control circuit controls an electrical power injected from a local oscillator into a mixer circuit, both of the components are included in the reception circuit, thereby making it possible to control the current flowing into the reception circuit. In this case, an electrical power injected into the mixer circuit in accordance with the control information representing the mode where a transmission signal is transmitted is preferably larger than an electrical power injected into the mixer circuit in accordance with the control information representing the mode where no transmission signal is transmitted. In this case also, the low current consumption can be realized when no transmission signal is transmitted. Specifically, for example, the current control circuit may recognize a frequency of the transmission signal based on the control signal outputted from the transmission signal control circuit and controls the electrical power injected into the mixer circuit in accordance with the control information, stored in the storage section, representing the frequency, and the control information stored in the storage section may be set such that the closer a frequency bandwidth represented by the control information is to each end of the transmission frequency bandwidth, the larger the electrical power injected into the mixer circuit is.

Fourth Embodiment

In the first to third embodiments, the control information used for controlling the current is set assuming that the attenuation amount, within the transmission frequency bandwidth, of the reception filter included in the antenna duplexer 7 is previously recognized. However, the attenuation amount in the antenna duplexer changes due to manufacturing variations and ambient temperature changes. In order to avoid this problem, for the manufacturing variations, there is a method in which a nonvolatile memory is used as the storage section 6, and during manufacturing, an attenuation amount in the antenna duplexer 7 is examined and the control information different from product to product is determined based on the attenuation amount, thereby causing the storage section 6 to store the control information. Furthermore, for the ambient temperature changes, a temperature sensor may be provided in the wireless circuit device 1 so as to cause the storage section 6 to store the control information which is different depending on a temperature, and the current control circuit 5 may recognize the control information which is appropriate in accordance with the temperature detected by the temperature sensor, thereby controlling the current.

In a fourth embodiment, during a start-up time of the wireless circuit device and a training period immediately before starting transmission, a configuration for calculating the attenuation amount, within a transmission frequency bandwidth, of the reception filter will be described.

Figure 12A:
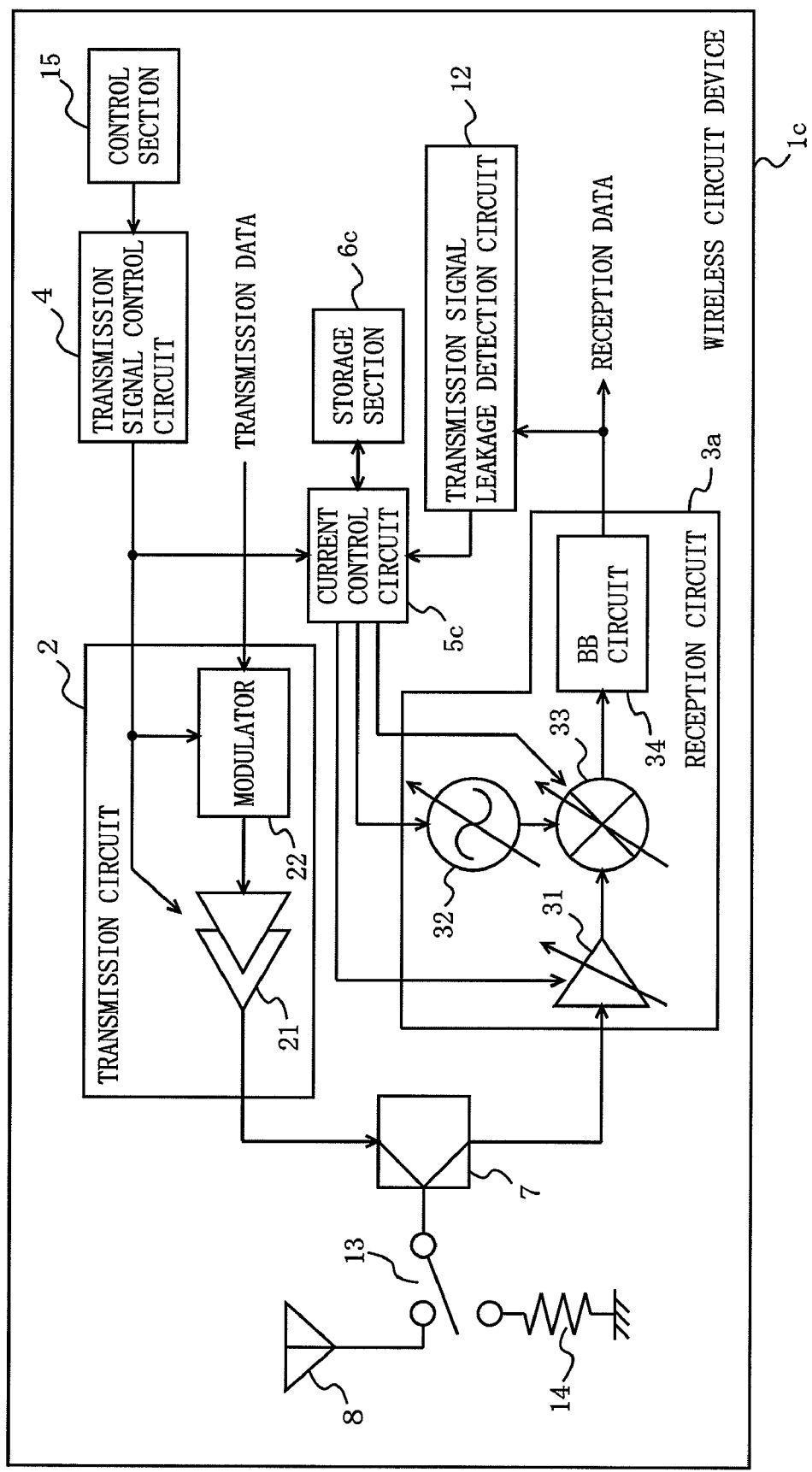
FIG. 12A is a block diagram illustrating a functional configuration of a wireless circuit device 1c according to a fourth embodiment of the present invention.

FIG. 12A is a block diagram illustrating a functional configuration of a wireless circuit device 1c according to the fourth embodiment of the present invention. In FIG. 12A, the blocks having the same functions as those of the wireless circuit device 1 or 1a according to the first or second embodiment will be denoted by the same reference numerals and will not be further described below. The wireless circuit device 1c is different from the wireless circuit device 1 in that, in the wireless circuit device 1c, the current control circuit 5 is replaced with a current control circuit 5c, the storage section 6 is replaced with a storage section 6c, the reception circuit 3 is replaced with the reception circuit 3a including the baseband circuit (the BB circuit) 34, and a transmission signal leakage detection circuit 12, a switch 13, a resistance 14 and a control section 15 are additionally provided.

When the training period arrives, the control section 15 inputs, to the transmission signal control circuit 4, a signal instructing to output a transmission signal while changing a frequency thereof. A frequency may be changed in a continuous manner, or changed in a discontinuous manner so as to represent each of the modes as shown in FIG. 3.

In the case where the control section 15 issues an instruction to output a transmission signal, the switch 13 is switched such that the antenna duplexer 7 and the resistance 14 are connected to each other. Thus, when the control section 15 causes the transmission circuit 2 to output the transmission signal, a terminal included in the antenna duplexer 7 and also provided at a side of the antenna 8 is grounded (terminated) via the resistance 14. One end of the resistance 14 is grounded. The switch 13 and the resistance 14 are comprised of a termination section.

The terminal included in the antenna duplexer 7 and also provided at the side of the antenna 8 is terminated via the resistance, whereby the transmission signal is not to be outputted from the antenna. Therefore, depending on a frequency of a transmission signal, the transmission signal may leak into the reception circuit 3a via the antenna duplexer 7.

Any signal outputted from the baseband circuit 34 during the training period is a leaked transmission signal. The transmission signal leakage detection circuit 12 detects a level of the leaked transmission signal during the training period so as to be inputted to the current control circuit 5c.

The current control circuit 5c recognizes the level of the transmission signal detected by the transmission signal leakage detection circuit 12. At the same time, the current control circuit 5c also recognizes a level of a transmission signal outputted from the transmission circuit 2 based on the signal outputted from the transmission signal control circuit 4. The current control circuit 5c compares the level of the leaked transmission signal with the level of the transmission signal outputted from the transmission circuit 2, thereby allowing the current control circuit 5c to recognize an amount by which the transmission signal outputted from the transmission circuit 2 is attenuated. As such, the current control circuit 5 can measure an attenuation amount, within the transmission frequency bandwidth, of the reception filter included in the antenna duplexer 7. The current control circuit 5c causes the storage section 6c to store the measured attenuation amount in accordance with a frequency of the transmission signal. The current control circuit 5c and the storage section 6c are comprised of a measurement storage section. The control section 15, the termination section, the transmission signal leakage detection circuit 12 and the measurement storage section are comprised of an attenuation amount measurement storage section for measuring the attenuation amount, within the transmission frequency bandwidth, of the reception filter of the antenna duplexer 7 during the training period.

FIG. 12B is a diagram illustrating an example of the control information previously stored in the storage section 6c (herein after, referred to as prestored control information). As shown in FIG. 12B, the LNA current, the MIX current and the LO level, all of which are associated with each of the modes, are previously stored in the storage section 6c in accordance with an attenuation amount. For example, in the second mode, the LNA current is stored as $A_{21}$ to $A_{2n}$, each designation representing a different attenuation amount.

FIG. 12C is a diagram illustrating an example of information concerning an attenuation amount measured by the current control circuit 5c stored in the storage section 6c (herein after, referred to as attenuation amount information). As shown in FIG. 12C, the storage section 6c stores attenuation amounts ($R_i$ to $R_e$) so as to be associated with the respective modes.

In the case where the training period is completed and then a transmission signal is transmitted from the antenna 8, the current control circuit 5c recognizes an attenuation amount associated with each of the modes based on the control information, and extracts the control information representing the attenuation amount from the prestored control information, thereby controlling the current flowing into the reception circuit 3a.

As described above, in the fourth embodiment, the current flowing into the reception circuit 3a is controlled after measuring the attenuation amount, within the transmission frequency bandwidth, of the reception filter during the training period. Thus, it becomes possible to provide the wireless circuit device 1c capable of controlling the reception circuit 3a such that the current flowing thereinto is maintained at an appropriate value obtained by taking into consideration the attenuation amount variations or the ambient temperature changes.

Note that the training period may arrive at regular intervals in operation of the wireless circuit device, other than at the start-up time of the wireless circuit device and at a time before transmitting a transmission signal.

Note that the fourth embodiment is applicable to the second and third embodiments.

Figure 13:
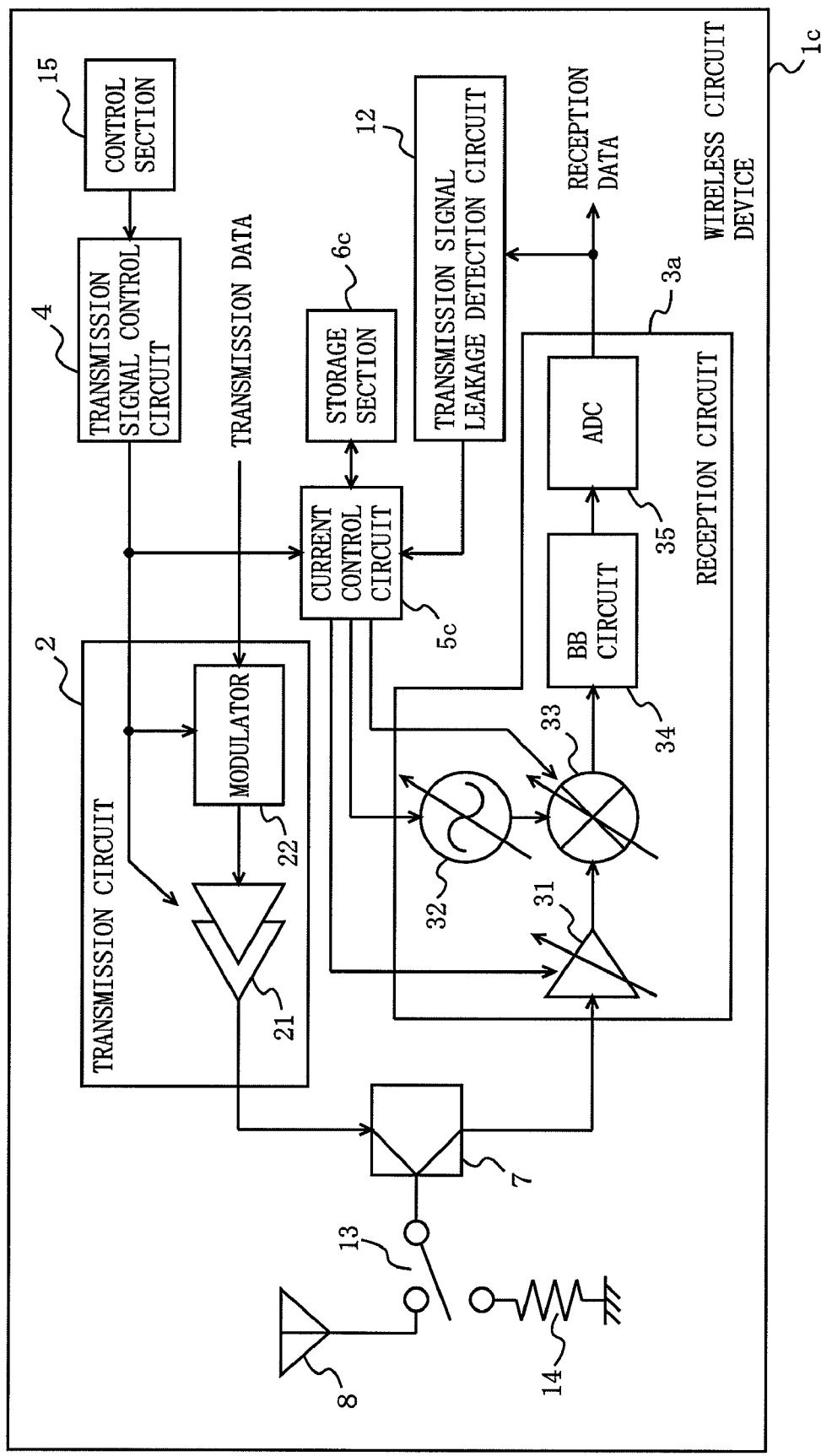
FIG. 13 is a diagram illustrating a functional configuration of the wireless circuit device 1c in which the reception circuit 3a further includes the AD converter 35.

In the fourth embodiment above, the reception circuit 3a may further include the AD converter (ADC) 35, as shown in FIG. 13. FIG. 13 is a diagram illustrating a functional configuration of the wireless circuit device 1c in which the reception circuit 3a further includes the AD converter 35. In FIG. 13, the AD converter 35, to which an analog signal outputted from the baseband circuit 34 is inputted, performs an AD conversion so as to convert the analog signal into a digital signal. The transmission signal leakage detection circuit 12 detects a level of the leaked transmission signal which is the digital signal. Thus, the transmission signal leakage detection circuit 12 can be digitalized, thereby making it possible to improve an accuracy of detecting the level of the leaked transmission signal. Furthermore, the current control circuit 5c also can be digitalized, thereby making it possible to control the current with high accuracy.

Fifth Embodiment

Figure 14:
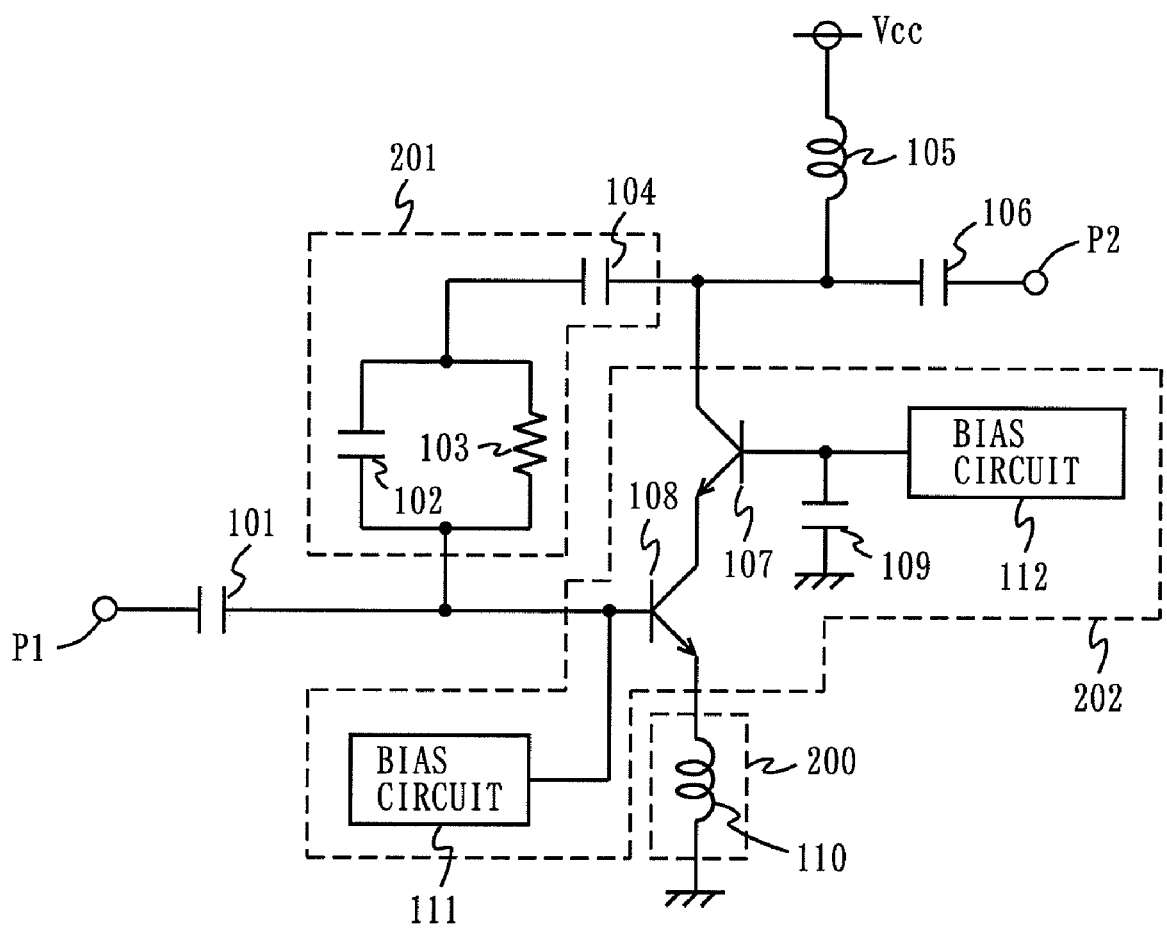
FIG. 14 is a circuit diagram illustrating an example of a configuration of a low-noise amplifier 31 used in the wireless circuit devices 1, 1a, 1b and 1c according to the first to fourth embodiments of the present invention.

FIG. 14 is a circuit diagram illustrating an example of a configuration of the low-noise amplifier 31 used in the wireless circuit devices 1, 1a, 1b and 1c according to the first to fourth embodiments of the present invention. The low-noise amplifier 31 shown in FIG. 14 includes an amplifier circuit 202, a phase control circuit 200, a feedback circuit 201, DC cut capacitors 101 and 106, and a choke inductor 105. The low-noise amplifier 31, having a characteristic that a phase difference between an input signal and a feedback signal becomes approximately 180 degrees under the action of the phase control circuit 200 and the feedback circuit 201, is used mainly within a high-frequency bandwidth.

The amplifier circuit 202 has bipolar transistors 108 and 107, a bypass capacitor 109, and bias circuits 111 and 112. The amplifier circuit 202 amplifies a signal inputted from an input terminal P1 and outputs the amplified signal from an output terminal P2.

The phase control circuit 200 has an inductor 110. The inductor 110 is used for adjusting a phase of a signal passing through the amplifier circuit 202. The phase control circuit 200 is disposed between an adjustment terminal of the amplifier circuit 200 and a GND, and changes the phase of the signal passing through the amplifier circuit 202.

The feedback circuit 201 has a resistance 103, a capacitor 102 and a DC cut capacitor 104, and feeds back an output of the amplifier circuit 202 to an input thereof while changing a phase of a signal passing therethrough (to approximately 180 degrees, for example). The resistance 103 and the capacitor 102 are used for adjusting the phase of the signal passing through the feedback circuit 201.

The low-noise amplifier 31 shown in FIG. 14 can feed back a second-order harmonic whose phase is converted by 180 degrees to an input. In other words, the low-noise amplifier 31 can negatively feed back a second-order harmonic to an input. Furthermore, a frequency of a third-order harmonic is adjacent to a frequency f0 of a fundamental wave. Therefore, the low-noise amplifier 31 can feed back the third-order harmonic whose phase is converted by 180 degrees to an input. In other words, the low-noise amplifier 31 can negatively feed back a third-order harmonic to an input.

As described above, the low-noise amplifier 31 shown in FIG. 14 causes the inductor 110 to adjust the phase of the signal passing through the amplifier circuit 202, and causes the resistance 103 and the capacitor 102 to adjust the phase of the signal passing through the feedback circuit 201, thereby making it possible to negatively feed back each of the fundamental wave, the third-order harmonic and the second-order harmonic of an input signal to an input with a simple configuration. Furthermore, unlikely a conventional amplifier, a strip line or a slot line is not used in the low-noise amplifier 31. Therefore, even if used within a microwave bandwidth, the low-noise amplifier can be easily integrated into a semiconductor integrated circuit.

According to the low-noise amplifier 31 of the fifth embodiment, a phase of a feedback signal is adjusted in an appropriate manner by using the phase control circuit 200 and the feedback circuit 201, thereby making it possible to negatively feed back the fundamental wave, the third-order harmonic and the second-order harmonic of an input signal of an entire circuit. Therefore, it becomes possible to realize a high-frequency negative feedback amplifier having a wide dynamic range with a simple configuration.

Figure 15:
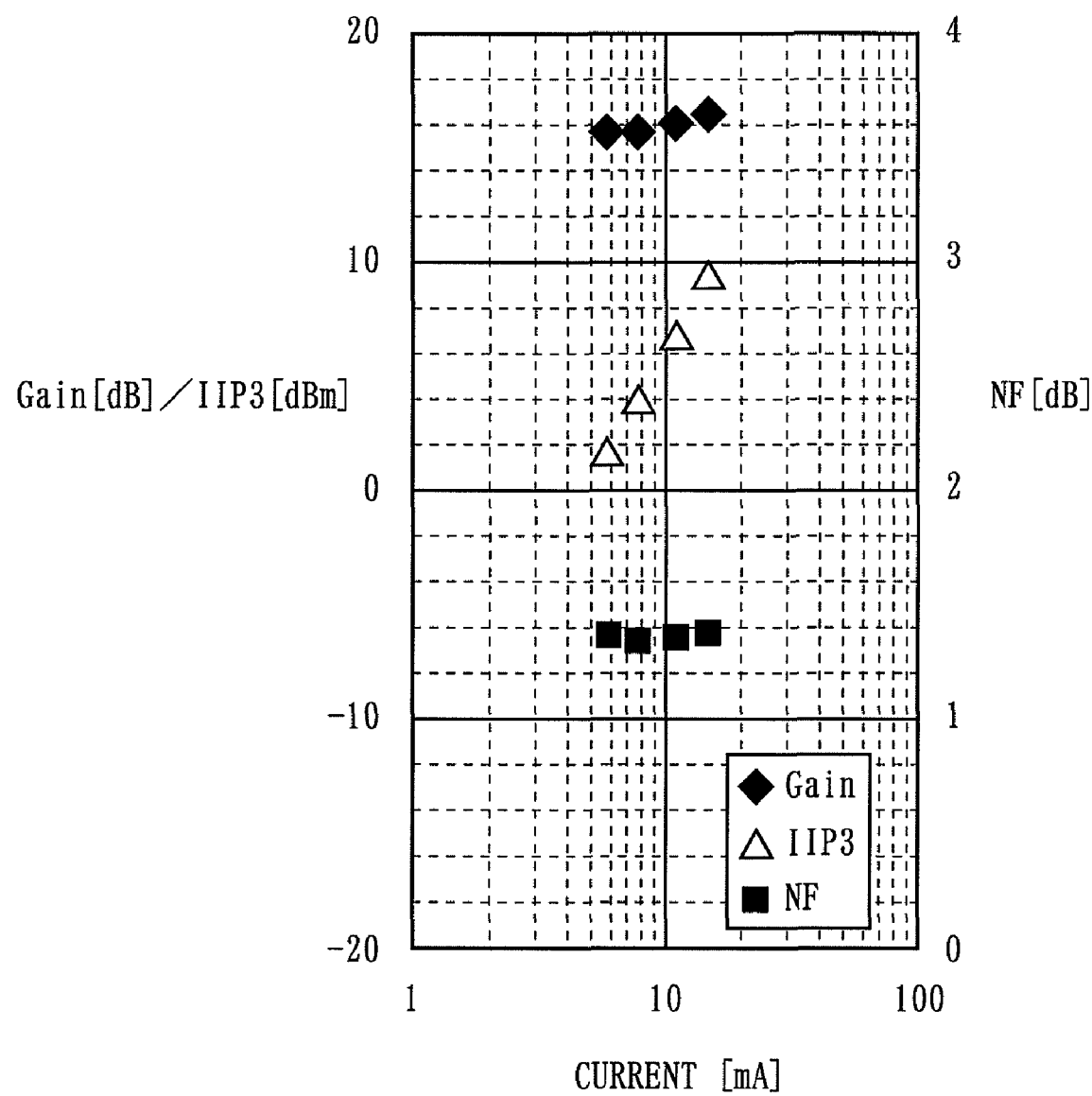
FIG. 15 is a diagram illustrating results obtained when measuring a high-frequency characteristic of the low-noise amplifier 31 shown in FIG. 9.

FIG. 15 is a diagram illustrating results obtained when measuring a high-frequency characteristic of the low-noise amplifier 31 shown in FIG. 14. As is clear from FIG. 15, when the current flowing into the low-noise amplifier 31 is increased, electrical power gain and noise figure (NF) are substantially constant, while a distortion characteristic (IIP3) is improved. The distortion characteristic becomes improved because a linearity of the low-noise amplifier 31 is improved. Therefore, the NF deterioration caused by saturation or the generation of a cross-modulation distortion component is reduced. The electrical power gain remains constant because when a gain of the amplifier circuit increases as a result of an increased current, a feedback amount is accordingly increased, whereby the increased gain and the increased feedback amount cancel each other out. The NF remains constant because an optimum size is selected for each of the bipolar transistors 108 and 107 of the amplifier circuit 202 so as to have a small current dependence. The IIP3 becomes improved because an amount, by which an IM3 component generated from the output of the amplifier circuit 202 is fed back to an input thereof so as to have an opposite phase, increases, and therefore a suppressed amount of the IM3 component outputted from the low-noise amplifier 31 accordingly increases.

Figure 16:
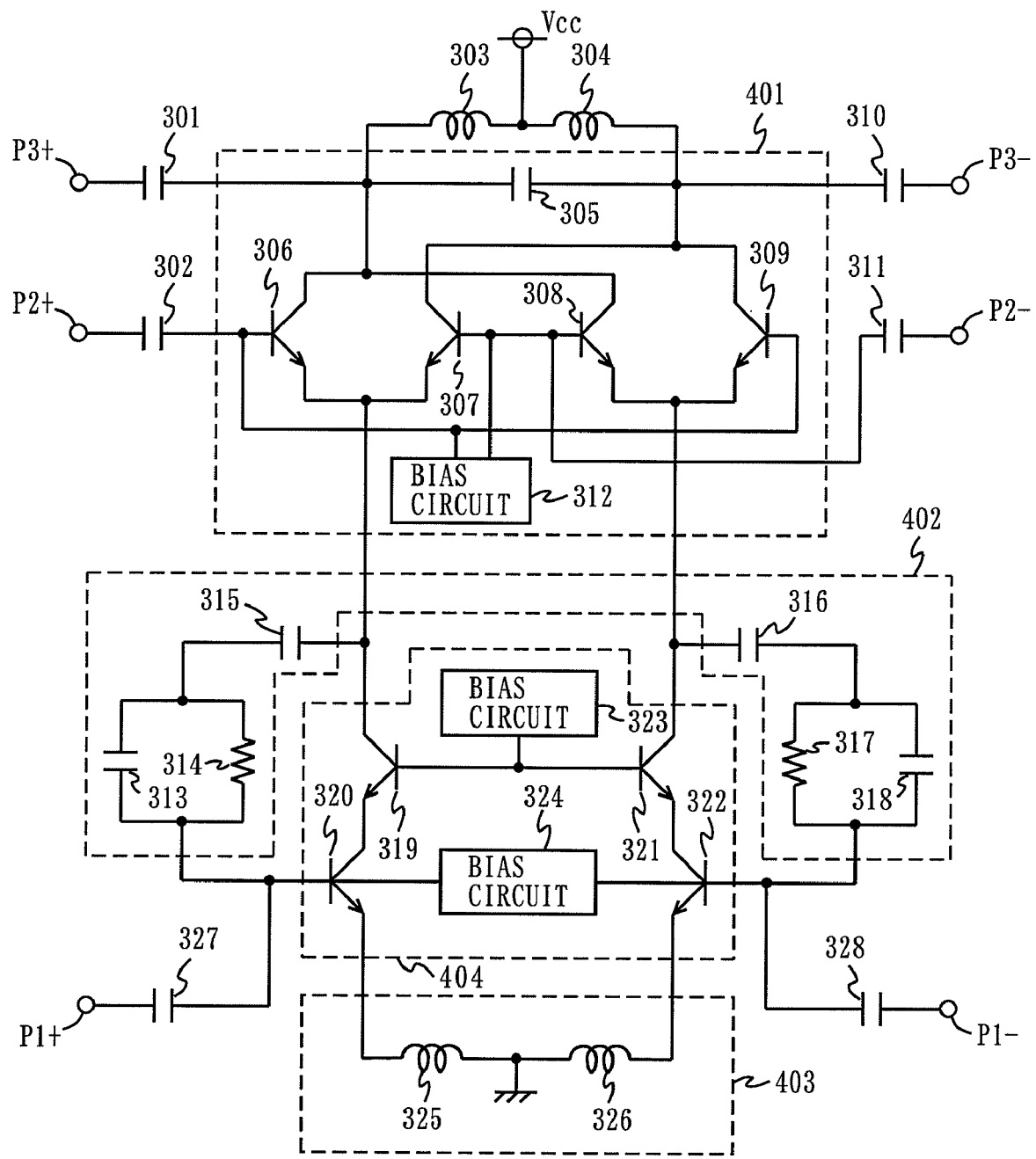
FIG. 16 is a circuit diagram illustrating an example of a configuration of a mixer 33 used in the wireless circuit devices 1, 1a, 1b and 1c according to the first to fourth embodiments of the present invention.
Figure 17:
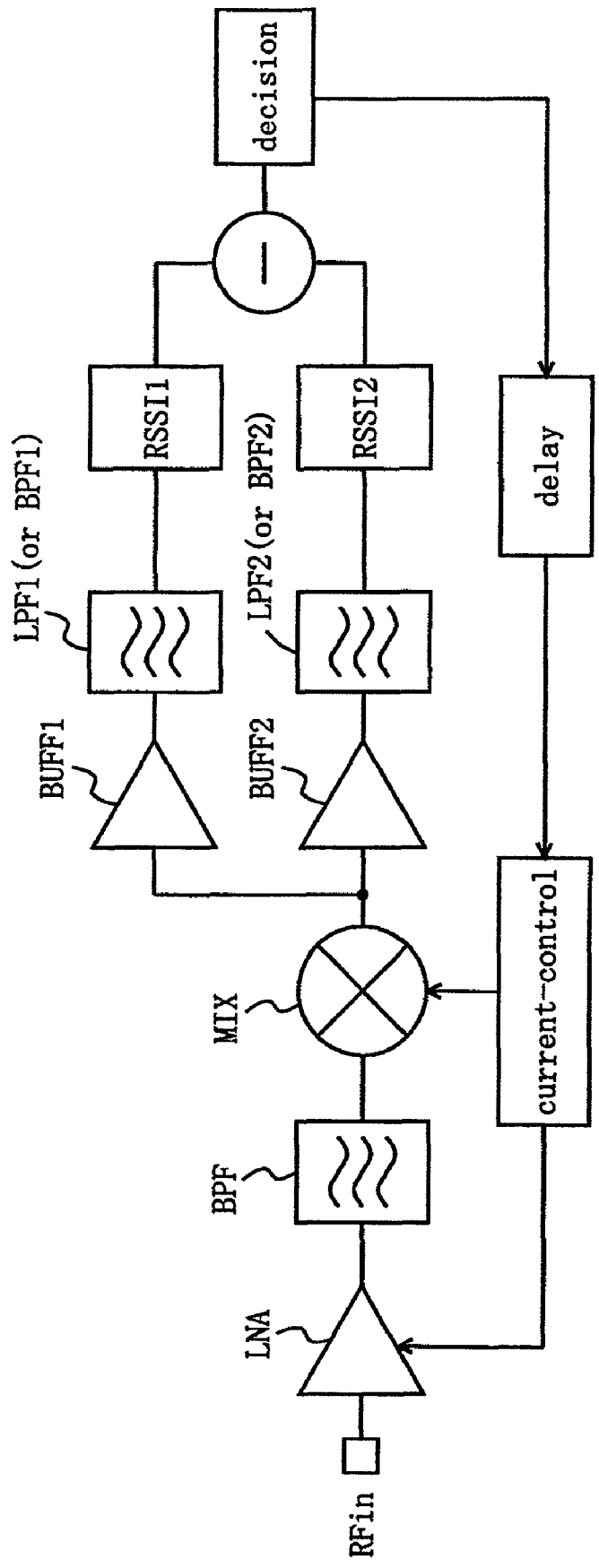
FIG. 17 is a block diagram illustrating a functional configuration of a radio disclosed in patent document 1.
Figure 18:
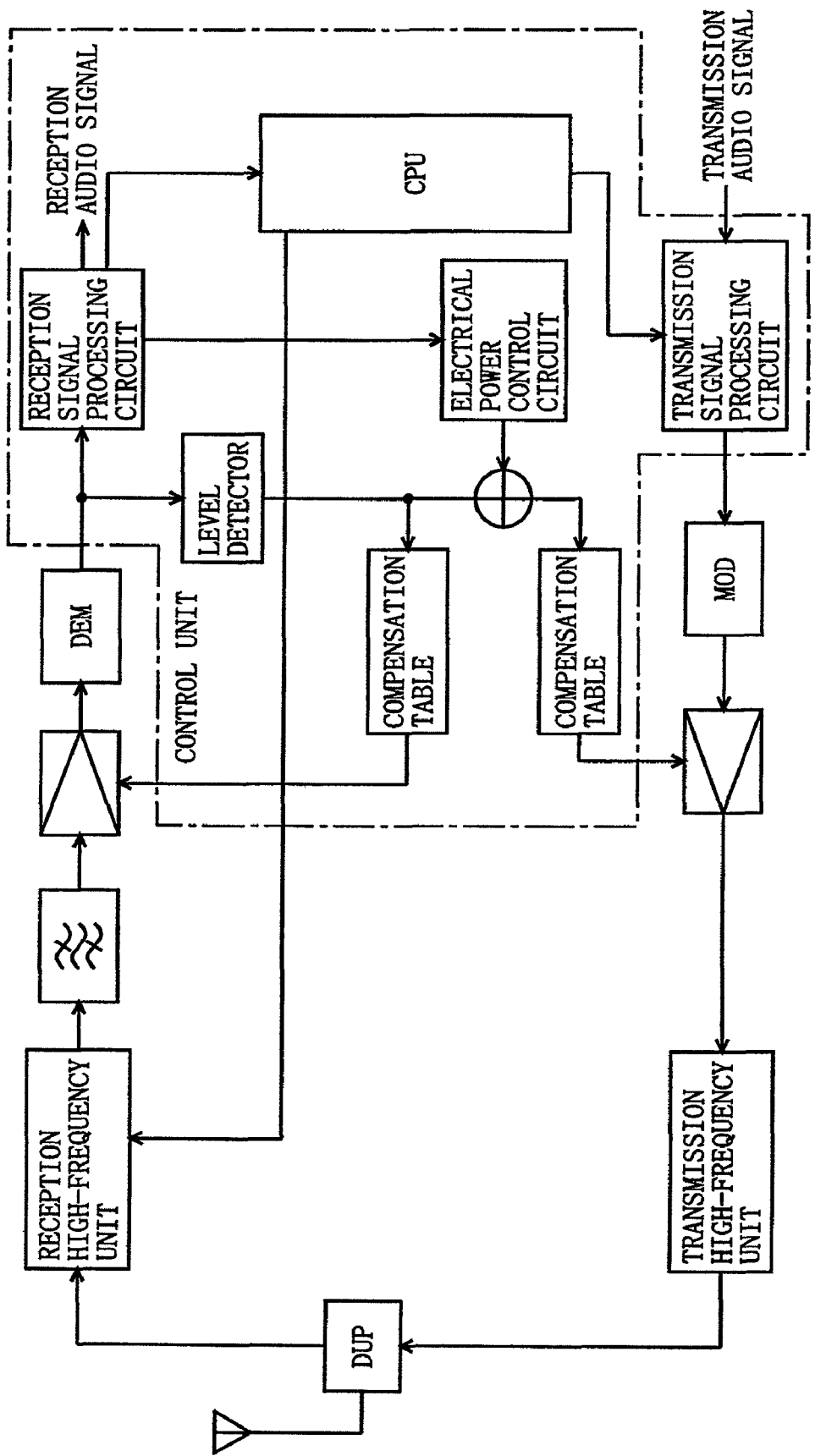
FIG. 18 is a block diagram illustrating a functional configuration of a wireless transmitter/receiver disclosed in patent document 2.
Figure 19:
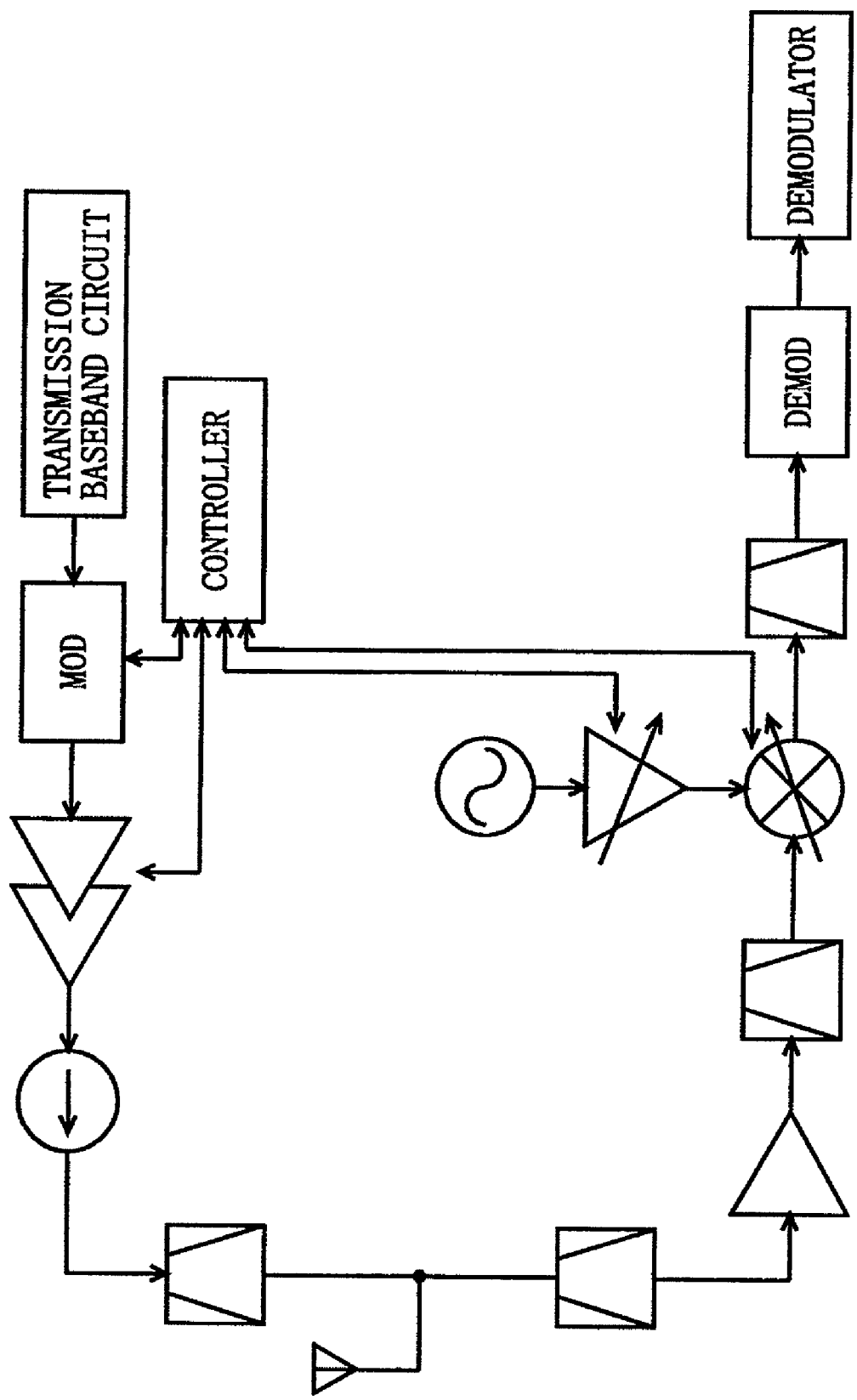
FIG. 19 is a block diagram illustrating a functional configuration of a wireless receiving device disclosed in patent document 3.
Figure 20:
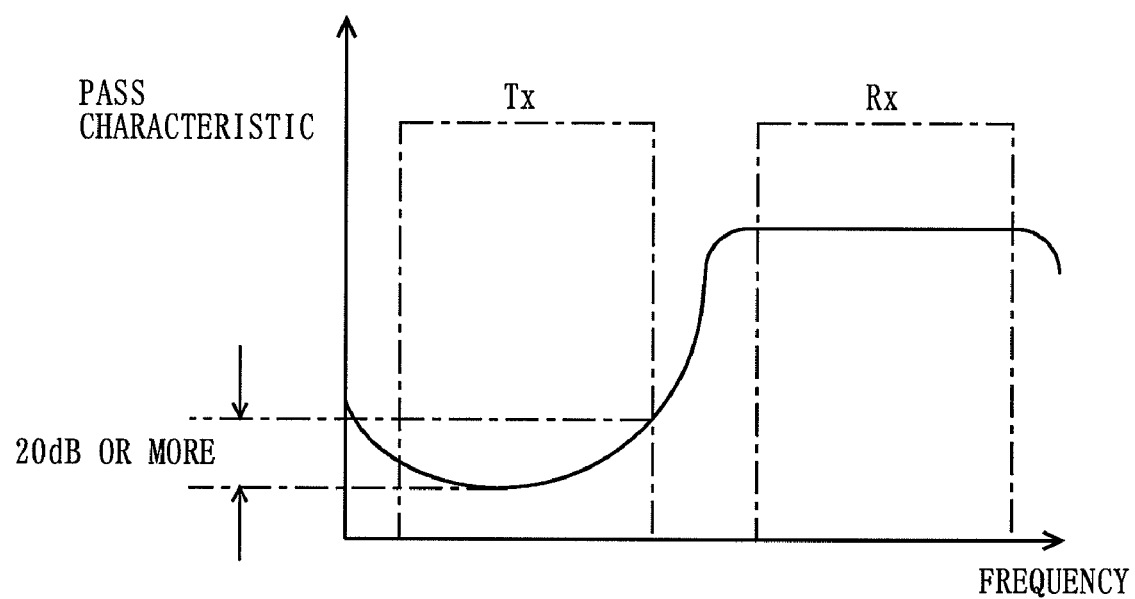
FIG. 20 is a diagram illustrating the frequency characteristic of a reception filter included in an antenna duplexer.

FIG. 16 is a circuit diagram illustrating an example of a configuration of the mixer 33 used in the wireless circuit devices 1, 1a, 1b and 1c according to the first to fourth embodiments of the present invention. The mixer 33 shown in FIG. 16 is configured by using differential pairs. The mixer 33 shown in FIG. 16 includes an amplifier circuit 404, a phase control circuit 403, a feedback circuit 402, a frequency conversion circuit 401, DC cut capacitors 301, 302, 310, 311, 327 and 328, and choke inductors 303 and 304.

The amplifier circuit 404 is disposed on a path from input terminals P1+ and P1− to an output terminal, and amplifies a signal inputted from the input terminals P1+ and P1− (differential signals). The amplifier circuit 404 has bipolar transistors 319 and 302 cascaded to each other, bipolar transistors 321 and 322 cascaded to each other, and bias circuits 323 and 324.

The phase control circuit 403 is disposed between an adjustment terminal of the amplifier circuit 404 and a GND, and changes a phase of a signal passing through the amplifier circuit 404. The phase control circuit 403 has inductors 325 and 326 connected in series with each other.

The feedback circuit 402 is disposed between an input of the amplifier circuit 404 and an output thereof, and feeds back the output of the amplifier circuit 404 to the input of the amplifier circuit 404 while changing a phase of a signal passing therethrough. The feedback circuit 402 has a resistance 314 and a capacitor 313 connected in parallel with each other, a DC cut capacitor 315, a resistance 317 and a capacitor 318 connected in parallel with each other, and a DC cut capacitor 316.

The frequency conversion circuit 401 converts a frequency of a signal amplified by the amplifier circuit 404. The frequency conversion circuit 401 has a bipolar transistor pair 306 and 307, a bipolar transistor pair 308 and 309, a DC cut capacitor 305, and a bias circuit 312.

An amplification portion of the mixer 33 shown in FIG. 16 has the same configuration as that of the low-noise amplifier 31 shown in FIG. 14, and thus the mixer 33 shown in FIG. 16 produces the same effect as that of the low-noise amplifier 31 shown in FIG. 14.

As described above, the low-noise amplifier 31 and the mixer 33 according to the fifth embodiment do not change the electrical power gain or the noise figure even when the current is increased. As a result, a level diagram of the wireless circuit device does not need to be significantly changed. Furthermore, by increasing the current, the distortion characteristic is improved. Accordingly, the reception sensitivity deterioration caused by the NF deterioration or cross-modulation interference is reduced.

Note that the low-noise amplifier 31 and the mixer 33 shown in FIG. 14 and FIG. 16, respectively, are disclosed in Japanese Laid-Open Patent Publication No. 2003-289226 in detail.

INDUSTRIAL APPLICABILITY

A wireless circuit device of the present invention can be used as a wireless circuit device for performing simultaneous transmission and reception, and is particularly applicable to a wireless circuit portion or the like of a wireless communication device such as a cellular phone or a wireless LAN.

The invention claimed is:
1. A wireless circuit device for transmitting and receiving a wireless signal, comprising:
an antenna for transmitting and receiving the wireless signal;
a transmission circuit for outputting a transmission signal;
a reception circuit to which a reception signal is inputted;
an antenna duplexer for supplying, to the antenna, the transmission signal outputted from the transmission circuit and for inputting the wireless signal received by the antenna to the reception circuit as the reception signal;

a transmission signal control circuit for controlling, by means of a control signal, the transmission signal to be outputted from the transmission circuit;

a storage section for storing control information used for controlling current flowing into the reception circuit, the control information comprising, control information representing a non-transmission mode where the transmission circuit transmits no transmission signal and at least two further pieces of control information respectively representing at least two transmission modes where the transmission circuit transmits the transmission signal; and a current control circuit for controlling the current flowing into the reception circuit in accordance with the control information, stored in the storage section, comprising the control information representing the non-transmission mode and the at least two further pieces of control information respectively representing the at least two transmission modes, wherein the current control circuit recognizes whether or not the transmission signal is transmitted based on the control signal outputted from the transmission signal control circuit, controls, when the transmission signal is transmitted, the current flowing into the reception circuit in accordance with one of the two further pieces of control information representing any of the at least two transmission modes, and controls, when no transmission signal is transmitted, the current flowing into the reception circuit in accordance with the control information representing the non-transmission mode.

2. The wireless circuit device according to claim 1, wherein the at least two transmission modes are different from each other in accordance with a frequency of the transmission signal, and the current control circuit recognizes a frequency of the transmission signal based on the control signal outputted from the transmission signal control circuit, and controls the current flowing into the reception circuit in accordance with one of the at least two pieces of control information representing one of the transmission modes with which the recognized frequency is associated.

3. The wireless circuit device according to claim 2, wherein the control information stored in the storage section is set such that the closer a frequency bandwidth, represented by one of the transmission modes with which the frequency of the transmission signal is associated, is to each end of a transmission frequency bandwidth, the larger the current flowing into the reception circuit becomes.

4. The wireless circuit device according to claim 1, wherein the at least two transmission modes are different from each other in accordance with an electrical power of the transmission signal, and the current control circuit recognizes an electrical power of the transmission signal based on the control signal outputted from the transmission signal control circuit, and controls the current flowing into the reception circuit in accordance with one of the at least two pieces of control information representing one of the transmission modes with which the recognized electrical power is associated.

5. The wireless circuit device according to claim 1, further comprising a reception level detection circuit for detecting a reception level of the reception signal including a desired wave, wherein the at least two transmission modes are different from each other in accordance with the reception level, and the current control circuit recognizes that the transmission signal is transmitted based on the control signal outputted from the transmission signal control circuit, recognizes the reception level detected by the reception level detection circuit, and controls the current flowing into the reception circuit in accordance with one of the at least two pieces of control information representing one of the transmission modes with which the recognized reception level is associated.

6. The wireless circuit device according to claim 5, wherein the at least two transmission modes are further different from each other in accordance with a frequency and an electrical power of the transmission signal, and the current control circuit further recognizes a frequency and an electrical power of the transmission signal, and controls the current flowing into the reception circuit in accordance with one of the at least two pieces of control information representing one of the transmission modes with which the recognized reception level detected by the reception level detection circuit and with which the recognized frequency and the recognized electrical power of the transmission signal are associated.

7. The wireless circuit device according to claim 5, further comprising an interference reception level detection circuit for detecting an interference reception level of the reception signal including an interference channel in a vicinity of the desired wave, wherein the at least two transmission modes are further different from each other in accordance with a frequency and an electrical power of the transmission signal, and in accordance with the interference reception level of the reception signal including the interference channel, and the current control circuit further recognizes the interference reception level detected by the interference reception level detection circuit, and controls the current flowing into the reception circuit in accordance with one of the at least two pieces of control information representing one of the transmission modes with which the recognized frequency and the recognized electrical power of the transmission signal, the recognized reception level detected by the reception level detection circuit, and the recognized interference reception level detected by the interference reception level detection circuit are associated.

8. The wireless circuit device according to claim 1, further comprising an interference reception level detection circuit for detecting an interference reception level of the reception signal including an interference channel in a vicinity of a desired wave, wherein the at least two transmission modes are different from each other in accordance with the interference reception level, and the current control circuit recognizes that the transmission signal is transmitted based on the control signal outputted from the transmission signal control circuit, recognizes the interference reception level, of the interference channel, detected by the interference reception level detection circuit, and controls the current flowing into the reception circuit in accordance with one of the at least two pieces of control information representing one of the transmission modes with which the recognized interference reception level is associated.

9. The wireless circuit device according to claim 8, wherein the interference reception level detection circuit selects a signal including an adjacent channel of the desired wave and a channel next to the adjacent channel, and detects a reception level of the signal as the interference reception level.

10. The wireless circuit device according to claim 1, wherein
the current flowing into the reception circuit when the current control circuit controls the reception circuit in accordance with one of the at least two pieces of control information representing one of the transmission modes is larger than the current flowing into the reception circuit when the current control circuit controls the reception circuit in accordance with the control information representing the non-transmission mode.

11. The wireless circuit device according to claim 1, wherein
the current control circuit controls the current flowing into the reception circuit by controlling an electrical power injected from a local oscillator into a mixer circuit, both of the local oscillator and the mixer circuit are included in the reception circuit.

12. The wireless circuit device according to claim 11, wherein
the electrical power injected into the mixer circuit in accordance with one of the at least two pieces of control information representing one of the transmission modes is larger than the electrical power injected into the mixer circuit in accordance with the control information representing the non-transmission mode.

13. The wireless circuit device according to claim 12, wherein
the at least two transmission modes are different from each other in accordance with a frequency of the transmission signal, and
the current control circuit recognizes a frequency of the transmission signal based on the control signal outputted from the transmission signal control circuit, and controls the electrical power injected into the mixer circuit in accordance with one of the at least two pieces of control information representing one of the transmission modes with which the frequency is associated, and
the control information stored in the storage section is set such that the closer a frequency bandwidth, represented by one of the transmission modes with which the frequency of the transmission signal is associated, is to each end of a transmission frequency bandwidth, the larger the electrical power injected into the mixer circuit becomes.

14. The wireless circuit device according to claim 1, wherein
the at least two transmission modes are different from each other in accordance with a frequency of the transmission signal, and
the wireless circuit device further comprises attenuation amount measurement storage means for measuring an attenuation amount, within a transmission frequency bandwidth, of a reception filter included in the antenna duplexer so as to be stored as attenuation amount information during a training period, and
the storage section previously stores, as prestored control information, the at least two pieces of control information respectively representing the at least two transmission modes in accordance with the attenuation amount, within the transmission frequency bandwidth, of the reception filter, and
the current control circuit recognizes a frequency of the transmission signal based on the control signal outputted from the transmission signal control circuit, and controls the current flowing into the reception circuit in accordance with one of the at least two pieces of control information representing the recognized frequency and the recognized attenuation amount with which the recognized frequency is associated.

15. The wireless circuit device according to claim 14, wherein
the training period is a start-up time of the wireless circuit device.

16. The wireless circuit device according to claim 14, wherein
the training period arrives at regular time intervals while the wireless circuit device is in operation.

17. The wireless circuit device according to claim 14, wherein
the training period arrives before the transmission signal is transmitted in the wireless circuit device.

18. The wireless circuit device according to claim 14, wherein
the attenuation amount measurement storage means includes:
a control section for causing the transmission circuit to output the transmission signal while changing the frequency of the transmission signal during the training period;
a termination section for terminating an antenna-side terminal included in the antenna duplexer when the control section causes the transmission circuit to output the transmission signal;
a transmission signal leakage detection circuit for detecting a level of the transmission signal leaked into the reception circuit when the control section causes the transmission circuit to output the transmission signal; and
a measurement storage section for measuring, by comparing the level of the transmission signal detected by the transmission signal leakage detection circuit with a level of the transmission signal outputted from the transmission circuit, the attenuation amount, within the transmission frequency bandwidth, of the reception filter included in the antenna duplexer, and for storing the measured attenuation amount in accordance with the frequency of the transmission signal.

19. The wireless circuit device according to claim 1, wherein
the reception circuit includes a low-noise amplifier, and
the low-noise amplifier has:
an amplifier circuit, disposed on a path from an input terminal to an output terminal, for amplifying a signal inputted from the input terminal;
a feedback circuit, disposed between an input and an output of the amplifier circuit, for feeding back the output of the amplifier circuit to the input thereof while changing a phase of a signal passing through the feedback circuit; and
a phase control circuit, disposed between an adjustment terminal of the amplifier circuit and an GND, for changing a phase of a signal passing through the amplifier circuit.

20. The wireless circuit device according to claim 1, wherein
the reception circuit includes a mixer circuit, and
the mixer circuit has:
an amplifier circuit, disposed on a path from an input terminal to an output terminal, for amplifying a signal inputted from the inputted terminal;

a frequency conversion circuit for converting a frequency of the signal amplified by the amplifier circuit;

a feedback circuit, disposed between an input and an output of the amplifier circuit, for feeding back the output of the amplifier circuit to the input thereof while changing a phase of a signal passing through the feedback circuit; and a phase control circuit, disposed between an adjustment terminal of the amplifier circuit and a GND, for changing a phase of a signal passing through the amplifier circuit.

* * * * *